US012809167B2

(12) United States Patent
Kitahara et al.

(10) Patent No.: US 12,809,167 B2
(45) Date of Patent: Nov. 24, 2026

(54) LIGHT SOURCE UNIT, IMAGE DISPLAY DEVICE AND AUTOMOBILE

(71) Applicant: NICHIA CORPORATION, Anan (JP)

(72) Inventors: Wataru Kitahara, Kamiina-gun (JP); Takanori Aruga, Suwa-gun (JP); Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 50 days.

(21) Appl. No.: 18/956,890

(22) Filed: Nov. 22, 2024

(65) Prior Publication Data

US 2025/0085539 A1 Mar. 13, 2025

Related U.S. Application Data

(63) Continuation of application No. PCT/JP2023/019643, filed on May 26, 2023.

(30) Foreign Application Priority Data

May 30, 2022 (JP) ................................ 2022-087981

(51) Int. Cl.
*G02B 27/01* (2006.01)
*B60K 35/10* (2024.01)
(Continued)

(52) U.S. Cl.
CPC .......... *G02B 27/0101* (2013.01); *B60K 35/10* (2024.01); *B60K 35/22* (2024.01);
(Continued)

(58) Field of Classification Search
CPC ........ B60K 35/10; B60K 35/22; B60K 35/28; B60K 35/50; B60K 35/60; B60K 35/81;
(Continued)

(56) References Cited

U.S. PATENT DOCUMENTS 5,729,242 A 3/1998 Margerum et al.
5,764,407 A 6/1998 Nanba
(Continued)

FOREIGN PATENT DOCUMENTS

JP H03-273943 A 12/1991
JP H06-347708 A 12/1994
(Continued)

OTHER PUBLICATIONS

Non-Final Office Action in U.S. Appl. No. 18/691,498 dated Jan. 23, 2026.
(Continued)

*Primary Examiner* — Nan-Ying Yang
(74) *Attorney, Agent, or Firm* — Foley & Lardner LLP

(57) ABSTRACT

A light source unit includes: a display device configured to emit light that has a substantially Lambertian light distribution and to display an image including a plurality of pixels; a color change sheet on which light emitted from the display device is incident; an imaging optical system including an input element and an output element configured such that light emitted from the color change sheet is incident on the input element, light traveling via the input element is incident on the output element, and light emitted from the output element forms a first image corresponding to the image; and a drive unit configured to change a positional relationship of the display device and the color change sheet.

17 Claims, 22 Drawing Sheets

(51) Int. Cl.

| | |
|---|---|
| ***B60K 35/22*** | (2024.01) |
| ***B60K 35/28*** | (2024.01) |
| ***B60K 35/50*** | (2024.01) |
| ***B60K 35/60*** | (2024.01) |
| ***B60K 35/81*** | (2024.01) |
| ***B60K 37/00*** | (2006.01) |

(52) U.S. Cl.
CPC .............. *B60K 35/28* (2024.01); *B60K 35/50* (2024.01); *B60K 35/60* (2024.01); *B60K 35/81* (2024.01); *B60K 37/00* (2013.01); *G02B 27/0149* (2013.01); *G02B 2027/0154* (2013.01)

(58) Field of Classification Search
CPC ............ B60K 37/00; G02B 2027/0154; G02B 26/00; G02B 27/01; G02B 27/0101; G02B 27/0149; H10H 20/851
See application file for complete search history.

(56) References Cited

U.S. PATENT DOCUMENTS

| | | | |
|---|---|---|---|
| 10,606,075 | B2 | 3/2020 | Choi et al. |
| 11,169,377 | B1 | 11/2021 | Chen |
| 11,287,649 | B2 | 3/2022 | Hong |
| 2003/0035232 | A1 | 2/2003 | Sasaki |
| 2003/0107716 | A1 | 6/2003 | Ogawa |
| 2004/0080938 | A1* | 4/2004 | Holman .................. F21S 41/12 362/245 |
| 2004/0145814 | A1 | 7/2004 | Rogers |
| 2005/0007593 | A1 | 1/2005 | Lebens |
| 2005/0052617 | A1 | 3/2005 | Fujikawa et al. |
| 2007/0024977 | A1 | 2/2007 | Kawamura et al. |
| 2007/0146242 | A1 | 6/2007 | Miller et al. |
| 2008/0316606 | A1 | 12/2008 | Inoguchi et al. |
| 2009/0040588 | A1 | 2/2009 | Tonar et al. |
| 2009/0167989 | A1 | 7/2009 | Ito et al. |
| 2010/0109977 | A1 | 5/2010 | Yamazaki et al. |
| 2010/0271396 | A1 | 10/2010 | Nemeth et al. |
| 2011/0164311 | A1 | 7/2011 | Morikuni |
| 2012/0020092 | A1 | 1/2012 | Bailey |
| 2013/0163068 | A1* | 6/2013 | Matsuoka ............ G02B 26/007 359/296 |
| 2015/0253469 | A1 | 9/2015 | Le Gros et al. |
| 2015/0378104 | A1 | 12/2015 | Takahashi |
| 2016/0033813 | A1* | 2/2016 | Yoon ...................... G02B 5/201 349/108 |
| 2017/0146803 | A1 | 5/2017 | Kishigami et al. |
| 2017/0146809 | A1 | 5/2017 | Furuya |
| 2018/0024335 | A1 | 1/2018 | Uehara |
| 2018/0039077 | A1 | 2/2018 | Kuzuhara et al. |
| 2018/0352204 | A1 | 12/2018 | Fujita |
| 2018/0358339 | A1 | 12/2018 | Iguchi |
| 2019/0011712 | A1 | 1/2019 | Nagano et al. |
| 2019/0049725 | A1 | 2/2019 | Kondo et al. |
| 2019/0061525 | A1 | 2/2019 | Ji |
| 2019/0061638 | A1 | 2/2019 | Hisatsugu et al. |
| 2019/0071014 | A1 | 3/2019 | Misu |
| 2019/0072764 | A1 | 3/2019 | Lee et al. |
| 2019/0072799 | A1 | 3/2019 | Narushima |
| 2019/0073828 | A1 | 3/2019 | Oiwa |
| 2019/0235240 | A1 | 8/2019 | Nagano et al. |
| 2020/0050005 | A1 | 2/2020 | Kojima et al. |
| 2020/0201036 | A1 | 6/2020 | Hong |
| 2020/0271927 | A1 | 8/2020 | Kawana |
| 2020/0319456 | A1 | 10/2020 | Yatsu et al. |
| 2020/0333608 | A1 | 10/2020 | Katagiri et al. |
| 2021/0239989 | A1 | 8/2021 | Ide et al. |
| 2021/0325700 | A1 | 10/2021 | Chen |
| 2021/0373331 | A1 | 12/2021 | Gu et al. |
| 2021/0382304 | A1 | 12/2021 | You et al. |
| 2022/0035165 | A1 | 2/2022 | Takeda et al. |
| 2022/0046212 | A1 | 2/2022 | Xu et al. |
| 2022/0138916 | A1 | 5/2022 | Takagi et al. |
| 2022/0350139 | A1 | 11/2022 | Tsuda et al. |
| 2022/0365266 | A1 | 11/2022 | Cheng et al. |
| 2022/0365345 | A1 | 11/2022 | Hamada |
| 2023/0026137 | A1 | 1/2023 | Kusafuka et al. |
| 2023/0034288 | A1 | 2/2023 | Hong et al. |
| 2023/0118416 | A1 | 4/2023 | Hirata et al. |
| 2023/0206795 | A1 | 6/2023 | Lyou et al. |
| 2023/0207606 | A1 | 6/2023 | Mezouari et al. |
| 2023/0415576 | A1 | 12/2023 | Zozgornik |
| 2024/0061240 | A1 | 2/2024 | Hirata et al. |
| 2024/0210684 | A1 | 6/2024 | Kitahara et al. |
| 2024/0241421 | A1 | 7/2024 | Marchewka et al. |

FOREIGN PATENT DOCUMENTS

| | | | |
|---|---|---|---|
| JP | H07-140918 | A | 6/1995 |
| JP | H07-306377 | A | 11/1995 |
| JP | H09-200651 | A | 7/1997 |
| JP | H10-274740 | A | 10/1998 |
| JP | 2003-005073 | A | 1/2003 |
| JP | 2003-043360 | A | 2/2003 |
| JP | 2003-177320 | A | 6/2003 |
| JP | 2004-045718 | A | 2/2004 |
| JP | 2004-527801 | A | 9/2004 |
| JP | 2005-070255 | A | 3/2005 |
| JP | 2007-058163 | A | 3/2007 |
| JP | 2009-003128 | A | 1/2009 |
| JP | 2009-251194 | A | 10/2009 |
| JP | 2010-107873 | A | 5/2010 |
| JP | 2011-138086 | A | 7/2011 |
| JP | 2013-183042 | A | 9/2013 |
| JP | 2014-183192 | A | 9/2014 |
| JP | 2016-033867 | A | 3/2016 |
| JP | 2016-102810 | A | 6/2016 |
| JP | 2016-148829 | A | 8/2016 |
| JP | 2017-037304 | A | 2/2017 |
| JP | 2017-049371 | A | 3/2017 |
| JP | 2019-073272 | A | 5/2019 |
| JP | 2019-095690 | A | 6/2019 |
| JP | 2020-012986 | A | 1/2020 |
| JP | 2020-074005 | A | 5/2020 |
| JP | 2020-144184 | A | 9/2020 |
| JP | 6809441 | B2 | 1/2021 |
| JP | 2021-124527 | A | 8/2021 |
| JP | 2021-162801 | A | 10/2021 |
| JP | 2021-529332 | A | 10/2021 |
| JP | 2022-025889 | A | 2/2022 |
| JP | 2022-073094 | A | 5/2022 |
| JP | 2022-129223 | A | 9/2022 |
| WO | WO-2014/207457 | A1 | 12/2014 |
| WO | WO-2015/190157 | A1 | 12/2015 |
| WO | WO-2016/103418 | A1 | 6/2016 |
| WO | WO-2016/208195 | A1 | 12/2016 |
| WO | WO-2017/138242 | A1 | 8/2017 |
| WO | WO-2017/154360 | A1 | 9/2017 |
| WO | WO-2017/170702 | A1 | 10/2017 |
| WO | WO-2019/008684 | A1 | 1/2019 |
| WO | WO-2019/130860 | A1 | 7/2019 |
| WO | WO-2019/130944 | A1 | 7/2019 |
| WO | WO-2021/054277 | A1 | 3/2021 |
| WO | WO-2021/065820 | A1 | 4/2021 |
| WO | WO-2021/106689 | A1 | 6/2021 |

OTHER PUBLICATIONS

Notice of Allowance in U.S. Appl. No. 18/511,505 dated May 14, 2026.

Final Office Action in U.S. Appl. No. 18/538,112 dated Jul. 22, 2025.

Non-Final Office Action in U.S. Appl. No. 18/511,505 dated Feb. 13, 2026.

Notice of Allowance in U.S. Appl. No. 18/543,762 dated Jun. 16, 2026.

U.S. Appl. No. 18/390,954, filed Dec. 20, 2023, Kitahara et al.

U.S. Appl. No. 18/496,594, filed Oct. 27, 2023, Kitahara et al.

U.S. Appl. No. 18/511,505, filed Nov. 16, 2023, Kitahara et al.

U.S. Appl. No. 18/513,895, filed Nov. 20, 2023, Kitahara et al.

U.S. Appl. No. 18/538,112, filed Dec. 13, 2023, Aruga et al.

(56) References Cited

OTHER PUBLICATIONS

U.S. Appl. No. 18/543,762, filed Dec. 18, 2023, Kitahara et al.
U.S. Appl. No. 18/691,498, filed Mar. 13, 2024, Kitahara et al.
U.S. Appl. No. 18/867,745, filed Nov. 20, 2024, Kitahara et al.
International Search Report and Written Opinion of the International Searching Authority issued in the corresponding International Patent Application No. PCT/JP2023/019643, dated Jul. 4, 2023 with English language translations.
Non-Final Office Action in U.S. Appl. No. 18/496,594 dated Jul. 11, 2024.
Non-Final Office Action in U.S. Appl. No. 18/538,112 dated Nov. 5, 2024.
Notice of Allowance in U.S. Appl. No. 18/513,895 dated Aug. 6, 2024.
Non-Final Office Action on U.S. Appl. No. 18/390,954 dated Dec. 4, 2025.
Non-Final Office Action in U.S. Appl. No. 18/538,112 dated Mar. 19, 2025.
U.S. Appl. No. 18/870,981, filed Dec. 2, 2024, Kitahara et al.
U.S. Appl. No. 18/956,890, filed Nov. 22, 2024, Kitahara et al.
Notice of Allowance in U.S. Appl. No. 18/496,594 dated Dec. 4, 2024.
Non-Final Office Action in U.S. Appl. No. 18/870,981 dated Aug. 10, 2026.
Notice of Allowance in U.S. Appl. No. 18/978,166 dated Aug. 14, 2026.
Notice of Reasons for Refusal issued in Japanese Appl. No. 2022-182313 dated Sep. 2, 2026.
Notice of Reasons for Refusal issued in Japanese Appl. No. 2024-524176 dated Aug. 26, 2026.
Notice of Reasons for Refusal issued in Japanese Appl. No. 2024-526238 dated Aug. 26, 2026.
Non-Final Office Action in U.S. Appl. No. 18/867,745 dated Aug. 3, 2026.
Office Action issued in Japanese Appl. No. 2022-194460 dated Oct. 9, 2026.

* cited by examiner

| No. | PIXEL | COLOR CHANGE SHEET | | | NUMBER OF COLORS | |
|---|---|---|---|---|---|---|
| | | FIRST REGION | SECOND REGION | THIRD REGION | | |
| 1 | WHITE | BLUE FILM | GREEN FILM | RED FILM | 3 | FIRST EMBODIMENT |
| 2 | WHITE | GREEN FILM | RED FILM | (NONE) | 2 | FIRST MODIFICATION |
| 3 | WHITE | TRANSPARENT (TRANSMITS WHITE LIGHT) | RED FILM | (NONE) | 2 | SECOND MODIFICATION |
| 4 | WHITE | TRANSPARENT (TRANSMITS WHITE LIGHT) | GREEN FILM | (NONE) | 2 | SECOND MODIFICATION |
| 5 | WHITE | TRANSPARENT (TRANSMITS WHITE LIGHT) | BLUE FILM | (NONE) | 2 | SECOND MODIFICATION |
| 6 | BLUE | TRANSPARENT (TRANSMITS BLUE LIGHT) | GREEN FLUORESCER | RED FLUORESCER | 3 | SECOND EMBODIMENT |
| 7 | BLUE | GREEN FLUORESCER | RED FLUORESCER | (NONE) | 2 | FIRST MODIFICATION |
| 8 | BLUE | TRANSPARENT (TRANSMITS BLUE LIGHT) | GREEN FLUORESCER | (NONE) | 2 | SECOND MODIFICATION |
| 9 | BLUE | TRANSPARENT (TRANSMITS BLUE LIGHT) | RED FLUORESCER | (NONE) | 2 | SECOND MODIFICATION |
| 10 | BLUE | TRANSPARENT (TRANSMITS BLUE LIGHT) | YELLOW FLUORESCER | (NONE) | 2 | SECOND MODIFICATION |
| 11 | ULTRAVIOLET | BLUE FLUORESCER | GREEN FLUORESCER | RED FLUORESCER | 3 | THIRD EMBODIMENT |
| 12 | ULTRAVIOLET | BLUE FLUORESCER | GREEN FLUORESCER | (NONE) | 2 | MODIFICATION |
| 13 | ULTRAVIOLET | BLUE FLUORESCER | RED FLUORESCER | (NONE) | 2 | MODIFICATION |
| 14 | ULTRAVIOLET | BLUE FLUORESCER | YELLOW FLUORESCER | (NONE) | 2 | MODIFICATION |
| 15 | ULTRAVIOLET | GREEN FLUORESCER | RED FLUORESCER | (NONE) | 2 | MODIFICATION |

FIG. 17

LIGHT SOURCE UNIT, IMAGE DISPLAY DEVICE AND AUTOMOBILE

CROSS-REFERENCE TO RELATED APPLICATIONS

This application is a bypass continuation of PCT Patent Application No. PCT/JP2023/019643, filed on May 26, 2023, which claims priority to Japanese Patent Application No. 2022-087981, filed on May 30, 2022. The entire contents of these applications are incorporated herein by reference.

FIELD

Embodiments described herein relate generally to a light source unit, an image display device, and an automobile.

BACKGROUND

International Publication No. 2016/208195 discusses technology in which light emitted from a display device configured to display an image is sequentially reflected by multiple mirrors, and the light reflected by the final mirror is further reflected toward a user by a reflecting member such as a windshield or the like, thereby causing the user to view a virtual image corresponding to the image displayed by the display device. If, however, the image using the technology discussed in International Publication No. 2016/208195 is to be colorized, pixels must correspond respectively to the colors, which undesirably makes the display device larger.

SUMMARY

Embodiments of the invention are directed to a compact light source unit, an image display device, and an automobile that can display a color image.

A light source unit according to one aspect of the present invention includes a display device configured to display an image including a plurality of pixels, a color change sheet on which light emitted from the display device is incident, an imaging optical system, and a drive unit changing a positional relationship of the display device and the color change sheet. The imaging optical system includes an input element and an output element. Light emitted from the color change sheet is incident on the input element. Light traveling via the input element is incident on the output element. Light emitted from the output element forms a first image corresponding to the image. The color change sheet includes a first region on which light from the pixels is incident and a second region on which the light from the pixels is incident. The first region emits light of a first color. The second region emits light of a second color. The second color is different from the first color. The drive unit changes the positional relationship of the display device and the color change sheet between a first positional relationship in which light emitted from one of the pixels is incident on the first region, and a second positional relationship in which the light emitted from the one of the pixels is incident on the second region. The imaging optical system is substantially telecentric at the first image side. The light emitted from the display device has a substantially Lambertian light distribution.

An image display device according to one aspect of the present invention includes the light source unit and a reflection unit separated from the light source unit. The reflection unit reflects light emitted from the imaging optical system. The first image is formed between the light source unit and the reflection unit.

According to embodiments, a compact light source unit, an image display device, and an automobile that can display a color image can be realized.

BRIEF DESCRIPTION OF THE DRAWINGS

FIG. 17 shows the relationship between the color of the light emitted from the pixels of the display device and the configurations of the regions of the color change sheet;

DETAILED DESCRIPTION

Figure 1:
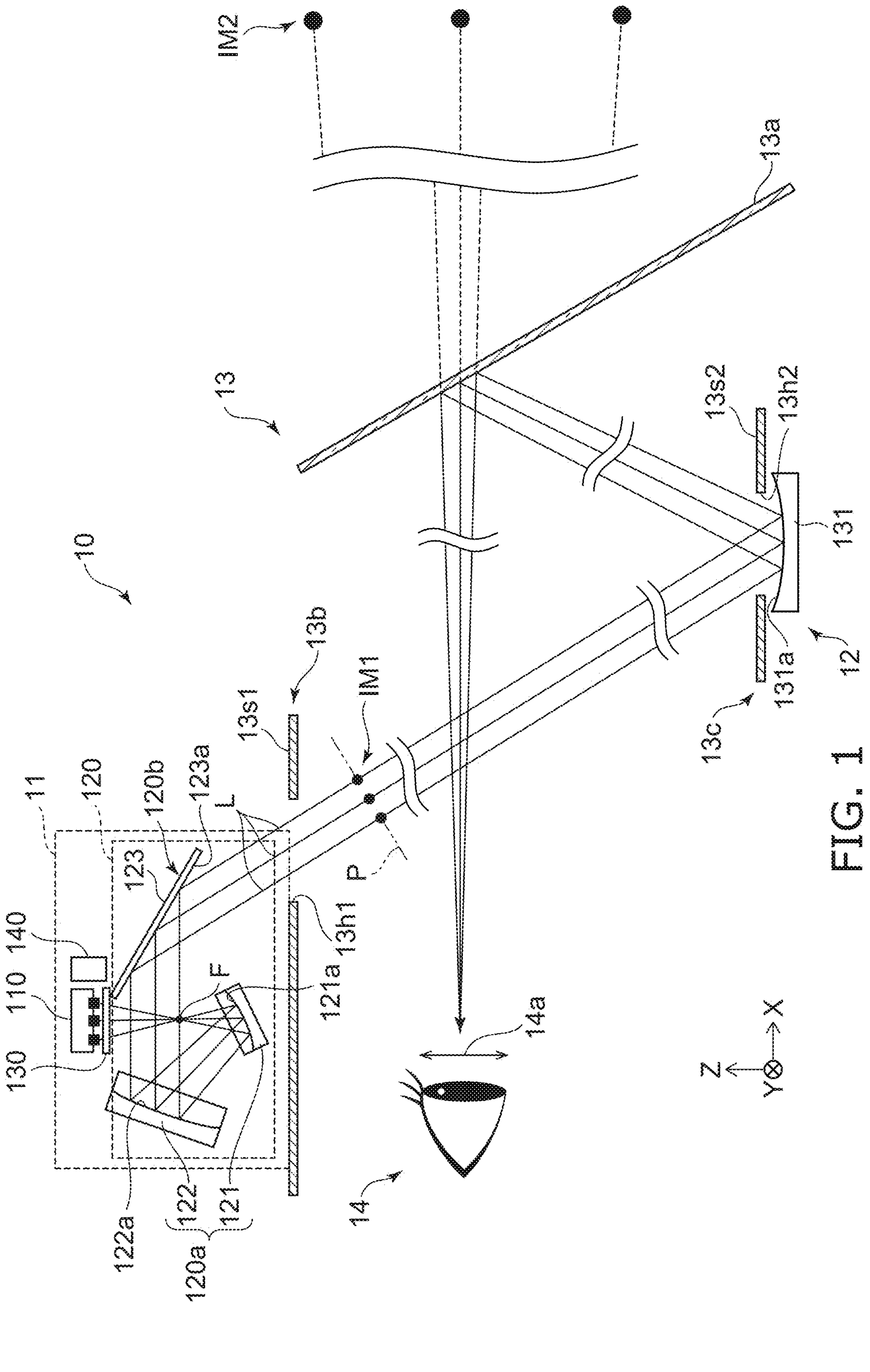
FIG. 1 is an end view showing an image display device according to a first embodiment.

Exemplary embodiments and their modifications will now be described with reference to the drawings. The drawings are schematic or conceptual, and are enhanced or simplified as appropriate. For example, the relationships between the thickness and width of portions, the proportional coefficients of sizes among portions, etc., are not necessarily the same as the actual values thereof. Furthermore, the dimensions and proportional coefficients may be illustrated differently among drawings, even for identical portions. In the specification of the application and the drawings, components similar to those in a previously described drawing are marked with like reference numerals, and a detailed description is omitted as appropriate.

First Embodiment

First, a first embodiment will be described.

FIG. 1 is an end view showing an image display device according to the embodiment.

Figure 2A:
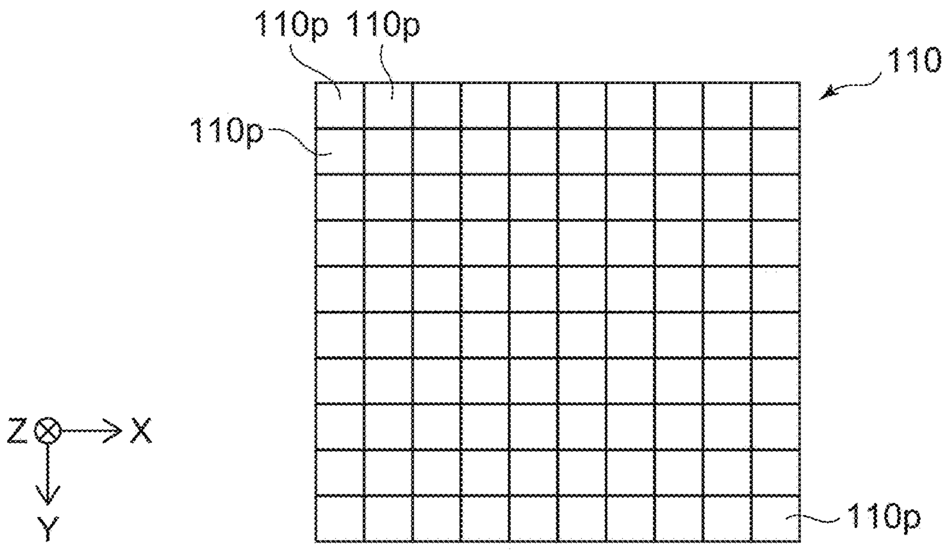
FIG. 2A is a plan view showing a display device of a light source unit according to the first embodiment.

FIG. 2A is a plan view showing a display device of a light source unit according to the embodiment.

Figure 2B:
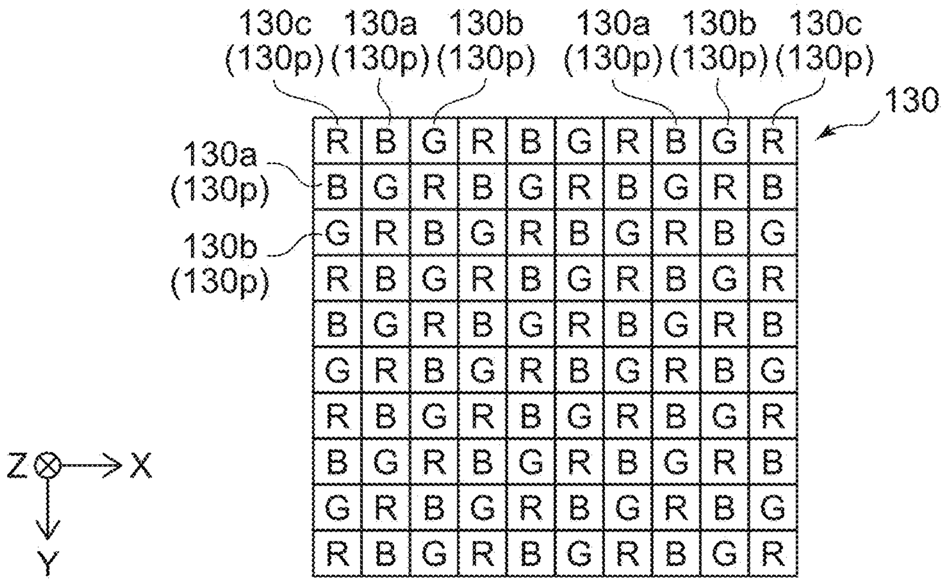
FIG. 2B is a plan view showing a color change sheet of the light source unit according to the first embodiment.

FIG. 2B is a plan view showing a color change sheet of the light source unit according to the embodiment.

Figure 2C:
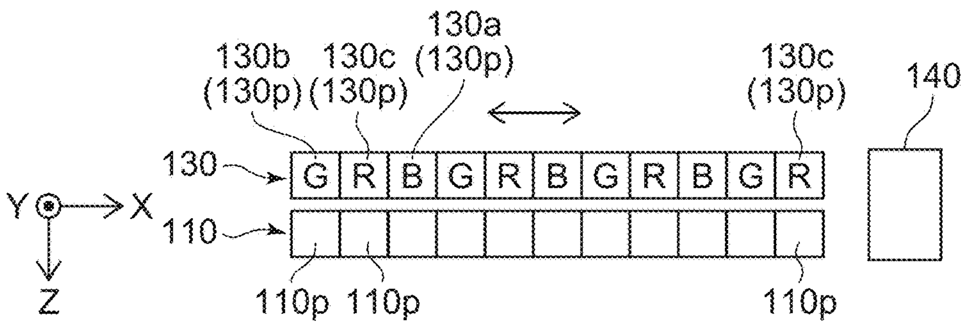
FIG. 2C is an end view showing the display device, the color change sheet, and a drive unit of the light source unit according to the first embodiment.

FIG. 2C is an end view showing the display device, the color change sheet, and a drive unit of the light source unit according to the embodiment.

As shown in FIG. 1, an image display device 10 according to the embodiment includes a light source unit 11 and a reflection unit 12. The light source unit 11 includes a display device 110, an imaging optical system 120, a color change sheet 130, and a drive unit 140. The display device 110 includes multiple pixels, and is configured to display an image. Light that is emitted from the display device 110 is incident on the color change sheet 130. The light that is emitted from the color change sheet 130 is incident on the imaging optical system 120 and forms a first image IM1 corresponding to the image displayed by the display device 110. The first image IM1 is a real image, and is an intermediate image. The drive unit 140 changes the positional relationship of the display device 110 and the color change sheet 130. The reflection unit 12 is separated from the light source unit 11 and reflects the light emitted from the imaging optical system 120.

For example, the image display device 10 is mounted in an automobile 1000, and is included in a HUD (Head Up Display). The automobile 1000 includes a vehicle 13, and the image display device 10 fixed to the vehicle 13. A viewer 14 is a passenger of the automobile 1000, and is, for example, the driver.

The display device 110 of the light source unit 11 displays an image to be viewed by the viewer 14 with the HUD. The color change sheet 130 changes the color of the image displayed by the display device 110 by pixel. This mechanism is described below. The imaging optical system 120 outputs the light emitted from the color change sheet 130 to the reflection unit 12 and forms the first image IM1 between the light source unit 11 and the reflection unit 12. The reflection unit 12 reflects the light emitted from the light source unit 11 toward a front windshield 13*a* of the vehicle 13. The front windshield 13*a* includes, for example, glass.

The inner surface of the front windshield 13*a* reflects the light from the reflection unit 12 and causes the light to enter an eyebox 14*a* of the viewer 14. As a result, the viewer 14 can view, beyond the front windshield 13*a*, a second image IM2 corresponding to the image displayed by the display device 110. The second image IM2 is a virtual image that is larger than the first image IM1. "Eyebox" refers to the area of space in front of the eyes of the viewer where the virtual image is visible.

Hereinbelow, the arrangements and configurations of the portions are described using an XYZ orthogonal coordinate system for easier understanding of the description. According to the embodiment, the longitudinal direction of the vehicle 13 is taken as an "X-direction," the lateral direction of the vehicle 13 is taken as a "Y-direction," and the vertical direction of the vehicle 13 is taken as a "Z-direction." The XY-plane is the horizontal plane of the vehicle 13. The direction of the arrow in the X-direction (front) also is called the "+X direction," and the opposite direction (back) also is called the "−X direction." The direction of the arrow in the Y-direction (left) also is called the "+Y direction," and the opposite direction (right) also is called the "−Y direction." The direction of the arrow in the Z-direction (up) also is called the "+Z direction," and the opposite direction (down) also is called the "−Z direction."

In FIG. 1, the position at which the first image IM1 is formed is illustrated by circular marks. Similarly to the first image IM1, the position at which the second image IM2 is formed is illustrated by circular marks. On the other hand, the emission positions in the display device 110 of chief rays L that reach the marks of the first image IM1 are illustrated by quadrilateral marks. Thus, although the marks used to illustrate the emission positions on the display device 110 of the chief rays L are different from those of the floating image formation position of the first image IM1 and the floating image formation position of the second image IM2 for easier understanding of the description, the image displayed on the display device 110, the first image IM1, and the second image IM2 have substantially similar relationships.

As shown in FIG. 2A, multiple pixels 110*p* are arranged in a matrix configuration along a first direction and a second direction in the display device 110. The second direction crosses, e.g., is orthogonal to, the first direction. For example, the first direction is the horizontal direction of the image, and the second direction is the perpendicular direction of the image. According to the embodiment, the first direction is taken as the X-direction, and the second direction is taken as the Y-direction. The same color of light is emitted from each pixel 110*p*, and the color of the light according to the embodiment is white. The light that is emitted from the display device 110 has a substantially Lambertian light distribution. The specific configuration and Lambertian light distribution of the display device 110 are described below in detail.

As shown in FIG. 2B, multiple regions 130*p* of the color change sheet 130 are arranged in a matrix configuration along the first and second directions. The shape and size of each region 130*p* are substantially equal to the shape and size of each pixel 110*p* of the display device 110, and the arrangement periods of the regions 130*p* are substantially equal to the arrangement periods of the pixels 110*p* in the first and second directions. Therefore, the pixels 110*p* of the display device 110 and the regions 130*p* of the color change sheet 130 have a one-to-one correspondence, and the entirety or a greater part of the light emitted from one pixel 110*p* is incident on one region 130*p*. However, as described below, the combination of the pixels 110*p* and the regions 130*p* is changed by an operation of the drive unit 140.

The regions 130*p* include the three types of a first region 130*a*, a second region 130*b*, and a third region 130*c*. The first region 130*a* emits light of a first color when the light from the pixel 110*p* of the display device 110 is incident. The second region 130*b* emits light of a second color, which is different from the first color, when the light from the pixel 110*p* is incident. The third region 130*c* emits light of a third color, which is different from the first and second colors, when the light from the pixel 110*p* is incident.

According to the embodiment, the first region 130*a*, the second region 130*b*, and the third region 130*c* are arranged repeatedly along the first direction (the X-direction) and the second direction (the Y-direction). Therefore, when focusing on a specific region of the color change sheet 130, the first region 130*a* and the second region 130*b* are arranged along the first direction (the X-direction), and the first region 130*a* and the third region 130*c* are arranged along the second direction (the Y-direction). Although one hundred regions 130*p* in ten rows and ten columns are shown in FIG. 2B, the regions 130*p* are not limited thereto; for example, thousands of regions 130*p* may be included.

According to the embodiment, the first region 130*a* includes a blue film, and the first color is blue. The second region 130*b* includes a green film, and the second color is green. The third region 130*c* includes a red film, and the third color is red. In other words, the first region 130*a* emits blue light when white light from the pixel 110*p* of the display device 110 is incident. The second region 130*b* emits green light when the white light from the pixel 110*p* is incident. The third region 130*c* emits red light when the white light from the pixel 110*p* is incident. In FIG. 2B, the first region 130*a* that emits blue light is marked with the character "B," the second region 130*b* that emits green light is marked with the character "G," and the third region 130*c* that emits red light is marked with the character "R." This is similar for the other embodiments and modifications described below as well.

As shown in FIG. 2C, the color change sheet 130 is located at the light-emitting side, i.e., the −Z direction side, of the display device 110. For example, the drive unit 140 includes an actuator and changes the positional relationship between the display device 110 and the color change sheet 130 by moving the color change sheet 130. The drive unit 140 may move the display device 110, or may move both the display device 110 and the color change sheet 130. In the example of the following description, the drive unit 140 moves the color change sheet 130.

The configuration of the image display device 10 other than the configuration described above will now be described.

First, the display device 110 will be described.

Figure 3:
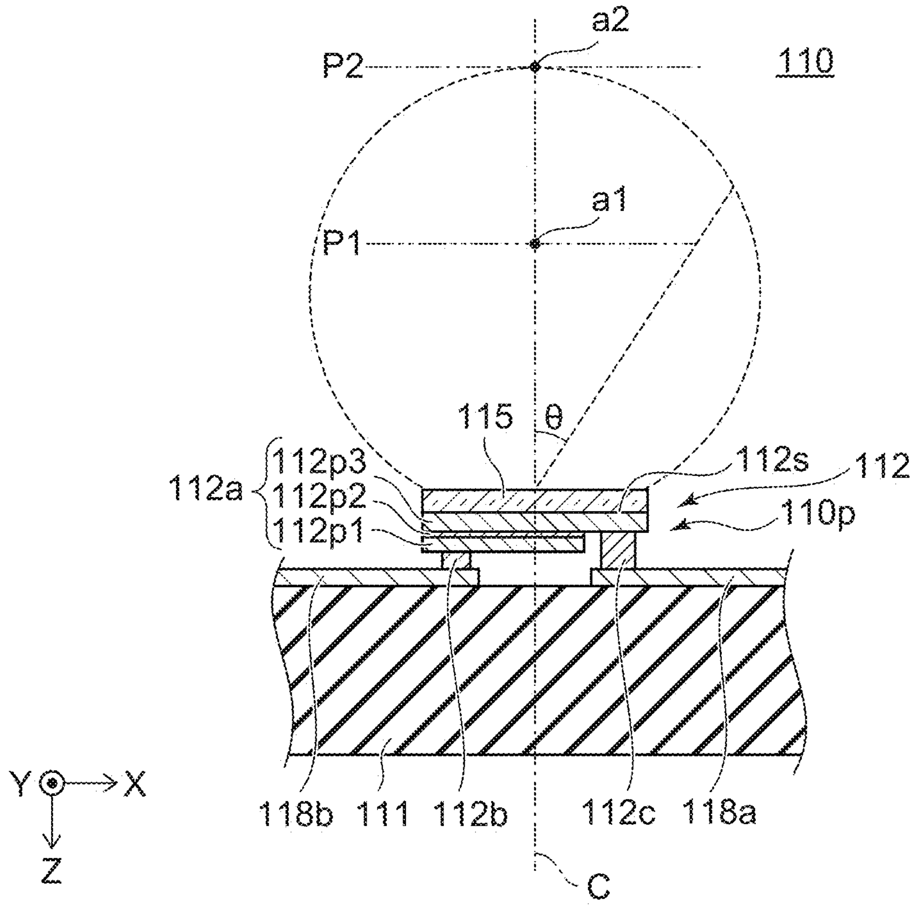
FIG. 3 is an end view showing the display device of the image display device according to the first embodiment.

FIG. 3 is an end view showing the display device of the image display device according to the embodiment.

The display device 110 of the light source unit 11 is an LED display. The multiple LED elements 112 are arranged in a matrix configuration in the display device 110. One or multiple LED elements 112 are located in each pixel 110*p* of the display device 110.

In the display device 110 as shown in FIG. 3, each LED element 112 is mounted face-down on a substrate 111. However, each LED element may be mounted face-up on the substrate. Each LED element 112 includes a semiconductor stacked body 112*a*, an anode electrode 112*b*, and a cathode electrode 112*c*.

The semiconductor stacked body 112*a* includes a p-type semiconductor layer 112*p*1, an active layer 112*p*2 located on the p-type semiconductor layer 112*p*1, and an n-type semiconductor layer 112*p*3 located on the active layer 112*p*2. The semiconductor stacked body 112*a* includes, for example, a gallium nitride compound semiconductor of $In_XAl_YGa_{1-X-Y}N$ ($0 \le X$, $0 \le Y$, and $X+Y<1$). According to the embodiment, the light that is emitted by the LED element 112 is visible light.

The anode electrode 112*b* is electrically connected to the p-type semiconductor layer 112*p*1. Also, the anode electrode 112*b* is electrically connected to a wiring part 118*b*. The cathode electrode 112*c* is electrically connected to the n-type semiconductor layer 112*p*3. Also, the cathode electrode 112*c* is electrically connected to another wiring part 118*a*. The electrodes 112*b* and 112*c* can include, for example, a metal material.

According to the embodiment, a wavelength conversion member 115 is located on each LED element 112. The light that is emitted from the LED element 112 is incident on the wavelength conversion member 115. For example, the wavelength conversion member 115 faces a light-emitting surface 112*s* of the LED element 112. In the specification, "the light-emitting surface of the LED element" means the surface of the LED element that mainly emits the light that is incident on the imaging optical system 120. According to the embodiment, the surface of the n-type semiconductor layer 112*p*3 that is positioned at the side opposite to the surface facing the active layer 112*p*2 corresponds to the light-emitting surface 112*s*.

The wavelength conversion member 115 includes a fluorescer. According to the embodiment, the LED element 112 emits blue light. The wavelength conversion member 115 includes a fluorescer absorbing blue light and radiating green light, and a fluorescer absorbing blue light and radiating red light. As a result, white mixed light that is made of blue light, green light, and red light is emitted from the wavelength conversion member 115.

Hereinbelow, the optical axis of the light emitted from each pixel 110*p* is called simply an "optical axis C." The optical axis C is, for example, a straight line that connects a point a1 in a first plane P1 and a point a2 in a second plane P2, wherein the first plane P1 is positioned at the light-emitting side of the display device 110 and parallel to the XY-plane in which the multiple pixels 110*p* are arranged, the luminance is a maximum at the point a1 in the range in which the light is irradiated from one pixel 110*p*, the second plane P2 is parallel to the XY-plane and separated from the first plane P1, and the luminance is a maximum at the point a2 in the range in which the light is irradiated from the pixel 110*p*. For example, if the luminance has maxima at multiple points, the center of the points may be used as the maximum luminance point. From the perspective of productivity, it is desirable for the optical axis C to be parallel to the Z-axis.

Thus, by providing the wavelength conversion member 115 at the light-emitting surface 112*s* of each LED element 112, the light that is emitted from the wavelength conversion member 115, i.e., the light that is emitted from each pixel 110*p*, has a substantially Lambertian light distribution as illustrated by the broken line in FIG. 3. Herein, "the light emitted from each pixel has a substantially Lambertian light distribution" means that the luminous intensity in the direction of an angle θ with respect to the optical axis C of each pixel has a light distribution pattern that can be approximated by $\cos^n\theta$ times the luminous intensity at the optical axis C, wherein n is a value greater than 0. Here, it is favorable for n to be not more than 11, and more favorably 1. Although many planes including the optical axis C of the light emitted from one pixel 110*p* exist, the light distribution pattern of the light emitted from the pixel 110*p* has a substantially Lambertian light distribution in each plane, and the numerical values of n are substantially equal.

The imaging optical system 120 will now be described in detail.

As shown in FIG. 1, the imaging optical system 120 of the light source unit 11 is an optical system that includes all of the optical elements necessary for forming the first image IM1 at the prescribed position. The embodiment includes an input element 121 on which the light emitted from the display device 110 is incident, an intermediate element 122 on which the light reflected by the input element 121 is incident, and an output element 123 on which the light reflected by the intermediate element 122 is incident. The light that is emitted from the output element 123 forms the first image IM1. It is sufficient for the light traveling via the input element 121 to be incident on the output element 123, and the intermediate element 122 may not be included.

The imaging optical system 120 is substantially telecentric at the first image IM1 side. Here, "the imaging optical system 120 is substantially telecentric at the first image IM1 side" means that the multiple chief rays L that are emitted from mutually-different positions of the display device 110, travel via the imaging optical system 120, and reach the first image IM1 are substantially parallel to each other before and after the first image IM1 as shown in FIG. 1. "Different positions" refer to, for example, different pixels 110*p* of the display device 110. "The multiple chief rays L being substantially parallel to each other" means being substantially parallel in a practical range that permits errors such as the manufacturing accuracy, assembly accuracy, etc., of the components of the light source unit 11. When "the multiple chief rays L are substantially parallel to each other," for example, the angle between the chief rays L is not more than 10 degrees.

When the imaging optical system 120 is substantially telecentric at the first image IM1 side, the multiple chief rays L cross each other before being incident on the input element 121. Hereinbelow, the point at which the multiple chief rays L cross each other is called a "focal point F." Therefore, for example, whether or not the imaging optical system 120 is substantially telecentric at the first image IM1 side can be confirmed by utilizing the backward propagation of light by the following method. First, a light source such as a laser light source or the like that can emit parallel light is disposed at the vicinity of the position at which the first image IM1 is formed. The light that is emitted from the light source is irradiated on the output element 123 of the imaging optical system 120. The light that is emitted from the light source and travels via the output element 123 is incident on the input element 121. Then, if the light that is emitted from the input element 121 condenses at a point, i.e., the focal point F, before reaching the display device 110, then the imaging optical system 120 can be determined to be substantially telecentric at the first image IM1 side.

Because the imaging optical system 120 is substantially telecentric at the first image IM1 side, the light emitted from each pixel of the display device 110 that is mainly incident on the imaging optical system 120 is the light that passes through the focal point F and the vicinity of the focal point F. Optical elements included in the imaging optical system 120 will now be described.

The input element 121 is positioned at the −Z side of the display device 110 and arranged to face the display device 110. The input element 121 is a mirror that includes a concave mirror surface 121*a*. The input element 121 reflects the light emitted from the display device 110.

The intermediate element 122 is positioned at the −X side of the display device 110 and the input element 121 and arranged to face the input element 121. The intermediate element 122 is a mirror that includes a concave mirror surface 122*a*. The intermediate element 122 further reflects the light reflected by the input element 121.

The input element 121 and the intermediate element 122 are included in a bending part 120*a* that bends the multiple chief rays L so that the multiple chief rays L emitted from mutually-different positions of the display device 110 are substantially parallel to each other. According to the embodiment, the mirror surfaces 121*a* and 122*a* are biconic surfaces. However, the mirror surfaces may be portions of spherical surfaces or may be freeform surfaces.

The output element 123 is positioned at the +X side of the display device 110 and the input element 121 and arranged to face the intermediate element 122. The output element 123 is a mirror that includes a flat mirror surface 123*a*. The output element 123 reflects the light traveling via the input element 121 and the intermediate element 122 toward the formation position of the first image IM1. Specifically, the multiple chief rays L that are substantially parallel due to the bending part 120*a* are incident on the output element 123. The mirror surface 123*a* is tilted in the +X/−Z direction with respect to the XY-plane, i.e., the horizontal plane of the vehicle 13. As a result, the light that is reflected by the intermediate element 122 is reflected by the output element 123 in a direction tilted in the +X/−Z direction with respect to the Z-direction. As shown in FIG. 1, the output element 123 is included in a direction modifying part 120*b* that modifies the directions of the multiple chief rays L so that the multiple chief rays L caused to be substantially parallel by the bending part 120*a* are directed toward a formation position P of the first image IM1.

According to the embodiment, the optical path between the input element 121 and the intermediate element 122 extends in a direction crossing the XY-plane. The optical path between the intermediate element 122 and the output element 123 extends in a direction along the XY-plane. Because a portion of the optical path inside the imaging optical system 120 extends in a direction crossing the XY-plane, the light source unit 11 can be somewhat smaller in directions along the XY-plane. Because another portion of the optical path inside the imaging optical system 120 extends in a direction along the XY-plane, the light source unit 11 can be somewhat smaller in the Z-direction.

The optical path between the display device 110 and the input element 121 crosses the optical path between the intermediate element 122 and the output element 123. Thus, by causing the optical paths to cross each other inside the light source unit 11, the light source unit 11 can be smaller.

However, the optical paths inside the light source unit are not limited to those described above. For example, all of the optical paths inside the imaging optical system may extend in directions along the XY-plane or may extend in directions crossing the XY-plane. The optical paths inside the light source unit may not cross each other.

The input element 121, the intermediate element 122, and the output element 123 each may include a main member made of glass, a resin material, or the like and a reflective film such as a metal film, a dielectric multilayer film, or the like forming the mirror surfaces 121*a*, 122*a*, and 123*a* located at the surface of the main member. The input element 121, the intermediate element 122, and the output element 123 each may be entirely formed of a metal material.

According to the embodiment as shown in FIG. 1, the light source unit 11 is located at a ceiling part 13*b* of the vehicle 13. For example, the light source unit 11 is located at the inner side of a wall 13*s*1 of the ceiling part 13*b* exposed inside the vehicle. A through-hole 13*h*1 through which the light emitted from the output element 123 of the light source unit 11 can pass is provided in the wall 13*s*1. The light that is emitted from the output element 123 passes through the through-hole 13*h*1 and is irradiated on the space between the viewer 14 and the front windshield 13*a*. However, the light source unit may be mounted to the ceiling surface. A transparent or semi-transparent cover having a small haze value may be located in the through-hole 13*h*1. It is favorable for the haze value to be not more than 50%, and more favorably not more than 20%.

Although the imaging optical system 120 is described above, the configuration and position of the coupling optical system are not limited to those described above as long as the coupling optical system is substantially telecentric at the first image side. For example, the number of optical elements included in the direction modifying part may be two or more.

The reflection unit 12 will now be described.

According to the embodiment as shown in FIG. 1, the reflection unit 12 includes a mirror 131 that includes a concave mirror surface 131*a*. The mirror 131 is arranged to face the front windshield 13*a*. The mirror 131 reflects the light emitted from the output element 123 and irradiates the light on the front windshield 13*a*. The mirror 131 may include a main member made of glass, a resin material, or the like and a reflective film such as a metal film, a dielectric multilayer film, or the like forming the mirror surface 131*a* located at the surface of the main member. The mirror 131 may be entirely formed of a metal material. In an example, the mirror surface 131*a* is a biconic surface. However, the mirror surface may be a portion of a spherical surface, or may be a freeform surface.

The light that is irradiated on the front windshield 13*a* is reflected by the inner surface of the front windshield 13*a* and enters the eyebox 14*a* of the viewer 14. As a result, the viewer 14 views, beyond the front windshield 13*a*, the second image IM2 corresponding to the image displayed in the display device 110.

According to the embodiment, the reflection unit 12 is located at a dashboard part 13*c* of the vehicle 13. For example, the reflection unit 12 is located at the inner side of a wall 13*s*2 of the dashboard part 13*c* of the vehicle 13 exposed inside the vehicle. A through-hole 13*h*2 through which the light emitted from the output element 123 of the light source unit 11 can pass is provided in the wall 13*s*2. The light that is emitted from the output element 123 passes through the through-hole 13*h*1, forms the first image IM1, subsequently passes through the through-hole 13*h*2, and is irradiated on the reflection unit 12. However, the reflection unit may be mounted to the upper surface of the dashboard part. The reflection unit may be located at the ceiling part, and the light source unit may be located at the dashboard part.

The path of the light that travels from the inner surface of the front windshield 13*a* toward the eyebox 14*a* is substantially horizontal, and is exactly horizontal or slightly tilted to be higher at the eyebox 14*a* side. In other words, the path is substantially parallel to the XY-plane. According to the embodiment, when referenced to the XY-plane including the path of the light, the light source unit 11 is located above (the +Z direction), and the reflection unit 12 is located below (the −Z direction). In other words, the light source unit 11 and the reflection unit 12 are separate with the XY-plane interposed.

Although the reflection unit 12 is described above, the configuration and position of the reflection unit are not limited to those described above. For example, the number of optical elements such as mirrors and the like included in the reflection unit may be two or more. The reflection unit 12 must be arranged so that, for example, sunlight that is irradiated from outside the vehicle via the front windshield 13*a* is not reflected toward the eyebox 14*a*.

An operation of the image display device 10 according to the embodiment will now be described.

Figure 4:
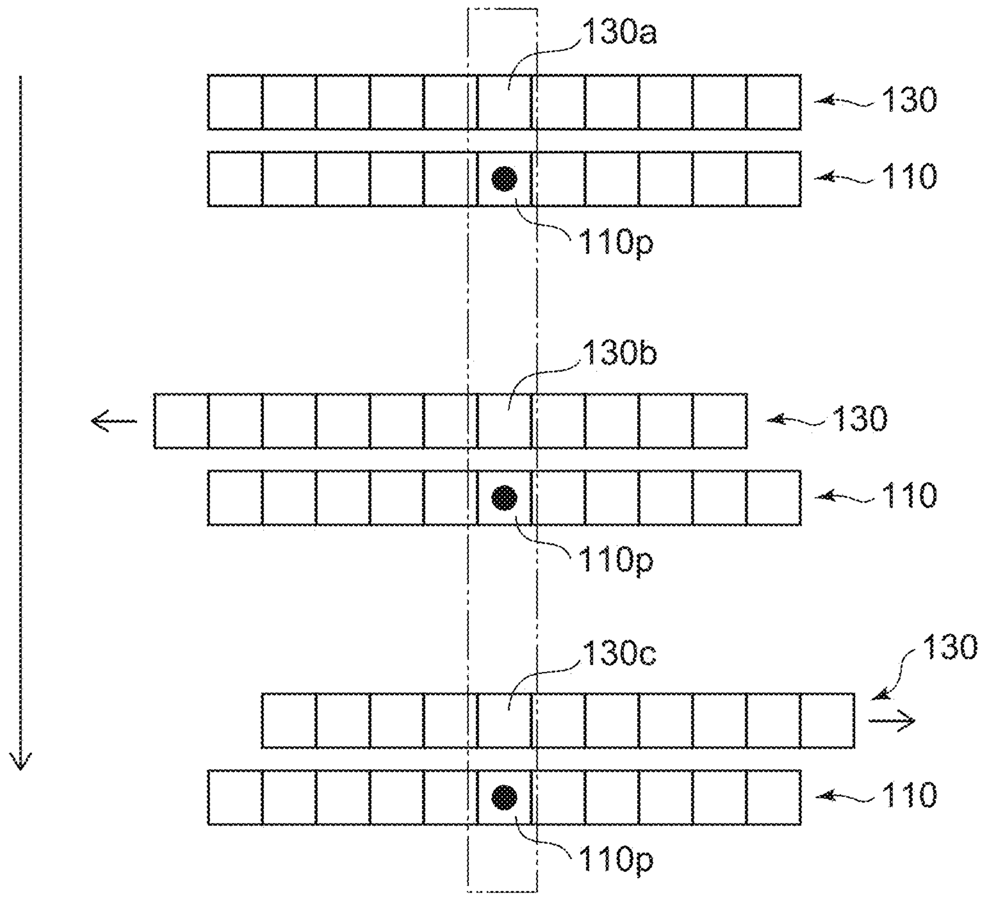
FIG. 4 is an end view showing changes of the positional relationship of pixels of the display device and regions of the color change sheet.

FIG. 4 is an end view showing changes of the positional relationship of pixels of the display device and regions of the color change sheet.

Figure 5A:
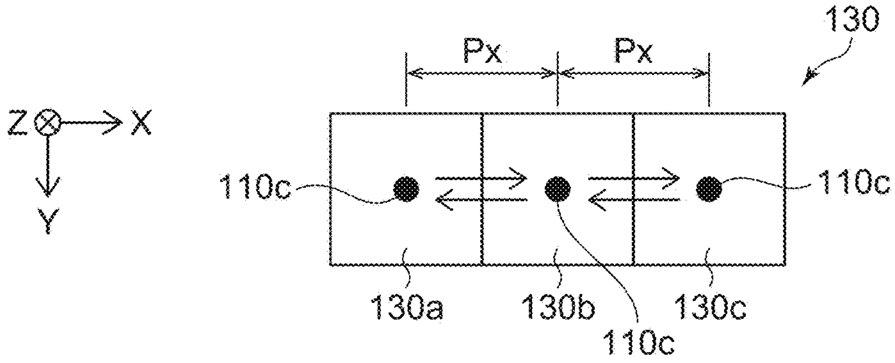
FIGS. 5A to 5C are plan views showing changes of the positional relationship of pixels of the display device and regions of the color change sheet according to the first embodiment.
Figure 5B:
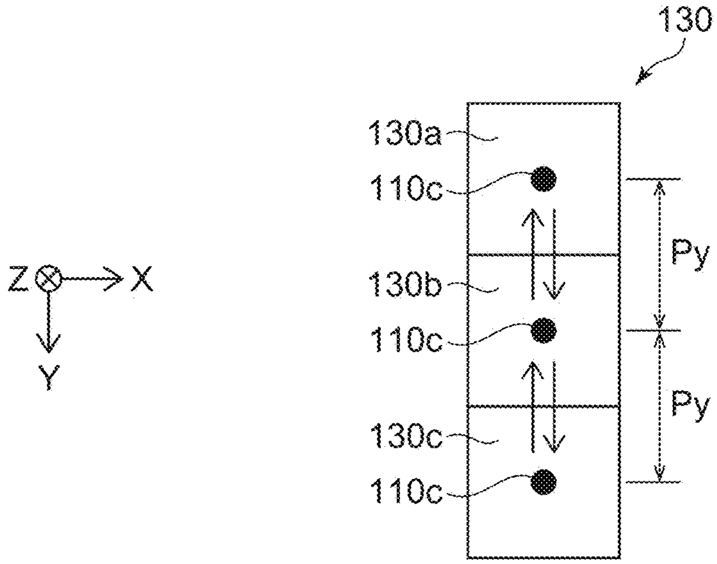
Figure 5C:
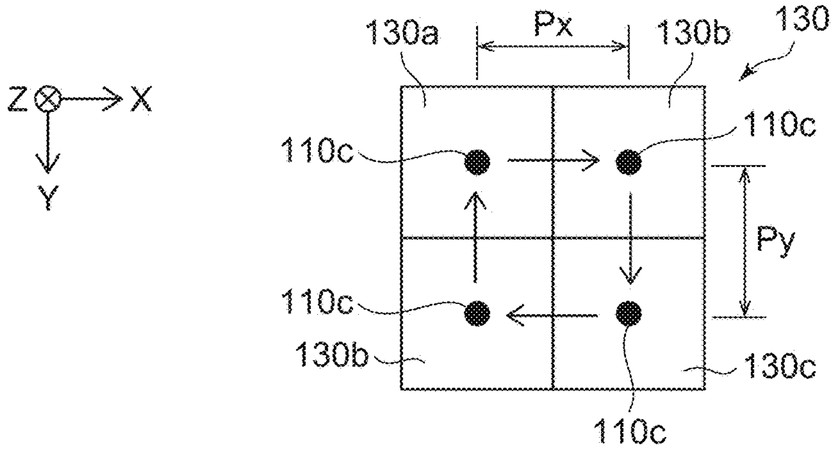

FIGS. 5A to 5C are plan views showing changes of the positional relationship of pixels of the display device and regions of the color change sheet according to the embodiment.

Figure 6:
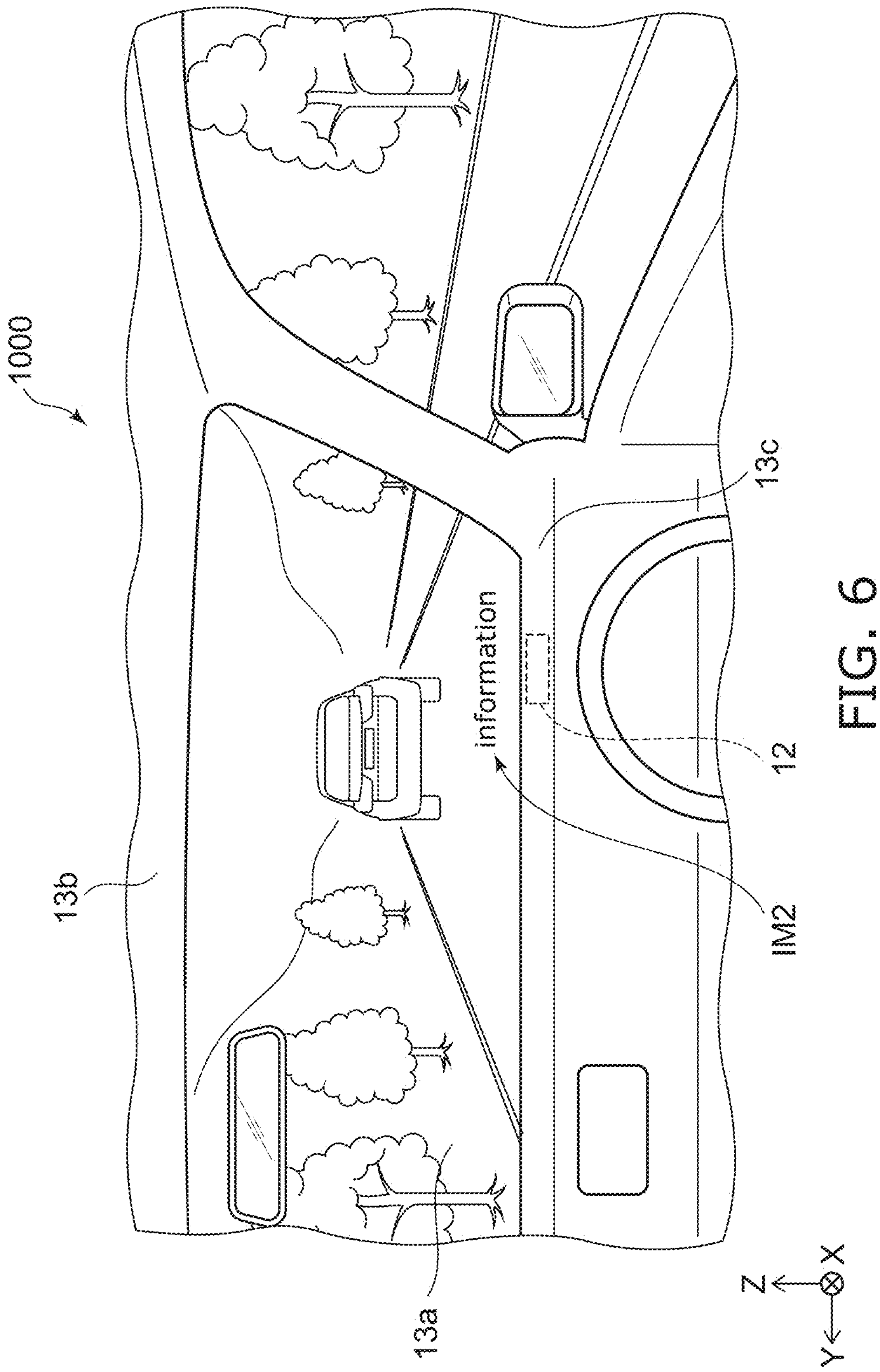
FIG. 6 is a schematic view showing a scenery when viewed by a viewer in a driver's seat according to the first embodiment.

FIG. 6 is a schematic view showing a scenery when viewed by a viewer in a driver's seat according to the embodiment.

As shown in FIG. 4, the drive unit 140 changes the positional relationship of the display device 110 and the color change sheet 130 between a first positional relationship in which light emitted from one pixel 110*p* of the display device 110 is incident on the first region 130*a* of the color change sheet 130, a second positional relationship in which the light emitted from the same one pixel 110*p* is incident on the second region 130*b*, and a third positional relationship in which the light emitted from the same one pixel 110*p* is incident on the third region 130*c*.

As a result, as shown in FIG. 5A, when referenced to the color change sheet 130, a center 110*c* of one pixel 110*p* moves between the center of the first region 130*a*, the center of the second region 130*b*, and the center of the third region 130*c* along the X-direction. The arrangement period of the regions 130*p* in the X-direction is taken as Px, and the movement amount of the center 110*c* of the pixel 110*p* is 2Px along the X-direction. In such a case, the drive unit 140 may oscillate the color change sheet 130 at the same period along the X-direction.

As shown in FIG. 5B, the drive unit 140 may move the color change sheet 130 along the Y-direction. In such a case, the arrangement period of the regions 130*p* in the Y-direction is taken as Py, and the movement amount of the center 110*c* of the pixel 110*p* is 2Py along the Y-direction. In such a case, the drive unit 140 may oscillate the color change sheet 130 at the same period along the Y-direction.

As shown in FIG. 5C, the drive unit 140 may move the color change sheet 130 in a ring shape in the XY-plane. In such a case, the movement amount of the center 110*c* of the pixel 110*p* is Px along the X-direction and Py along the Y-direction. For example, the region that is located directly above one pixel 110*p* is repeatedly changed in the order of first region 130*a* (blue)→second region 130*b* (green)→third region 130*c* (red)→second region 130*b* (green). In such a case, the drive unit 140 may move, at the same period, the color change sheet 130 in a rectangular shape or in a circular or elliptical motion.

The pixel 110*p* is lit by the display device 110 when a region of a specific color is located directly above the pixel 110*p*. For example, blue light can be emitted from one pixel 110*p* via the color change sheet 130 by the pixel 110*p* being lit in a period in which the first region 130*a* (blue) is located directly above the pixel 110*p* and by being unlit in other periods. Blue light and green light can be emitted from the pixel 110*p* via the color change sheet 130 by the pixel 110*p* being lit in the period in which the first region 130*a* (blue) is located directly above the pixel 110*p* and in the period in which a second region 130*b* (green) is located directly above the pixel 110*p*, and by the pixel 110*p* being unlit in a period in which the third region 130*c* (red) is located directly above the pixel 110*p*. The viewer 14 views a mixed color of blue and green if the period in which the drive unit 140 moves the color change sheet 130 is sufficiently short. Thus, a color image can be emitted from the light source unit 11 by time-division control of the pixels 110*p* of the display device 110 while the drive unit 140 changes the positional relationship of the display device 110 and the color change sheet 130.

Thus, light rays L that form a color image are emitted from the color change sheet 130. Based on the image, the imaging optical system 120 of the light source unit 11 forms the first image IM1, which is a real image, at the position P. Then, the light that forms the first image IM1 is reflected by the reflection unit 12 and the front windshield 13*a* and enters the eyebox 14*a* of the viewer 14.

As a result, as shown in FIG. 6, the viewer 14 views the second image IM2, which is a virtual image, beyond the front windshield 13*a*. The second image IM2 can be a color image or a monochrome image. Although the second image IM2 shows the character string "information" in FIG. 6, the second image IM2 is not limited to a character string and may be a figure, etc.

Effects of the embodiment will now be described.

According to the embodiment, a color image can be displayed by the display device 110 that emits monochromatic light and the color change sheet 130 that includes the regions 130*p* of multiple colors by the drive unit 140 changing the positional relationship between the display device 110 and the color change sheet 130. By using a monochromatic display device as the display device 110, the light source unit 11 can be smaller, and so the image display device 10 can be smaller.

It also may be considered for the display device 110 to display a color image by including three subpixels in each pixel 110*p* of the display device 110, and by including an LED element emitting blue light, an LED element emitting green light, and an LED element emitting red light respectively in the subpixels. However, in such a case, compared with the embodiment, the number of LED elements is three-fold, and so the display device 110 is larger and costs more. It also may be considered to set the number of LED elements to be equal to that of the embodiment, and to reduce the number of pixels. However, in such a case, the image definition degrades. In contrast, according to the embodiment, a compact light source unit and image display device that can display a high-definition color image can be realized.

Because the imaging optical system 120 is substantially telecentric at the first image IM1 side according to the embodiment, a high-quality image can be displayed while making the light source unit 11 and the image display device 10 smaller. This effect is described below in detail.

Figure 7A:
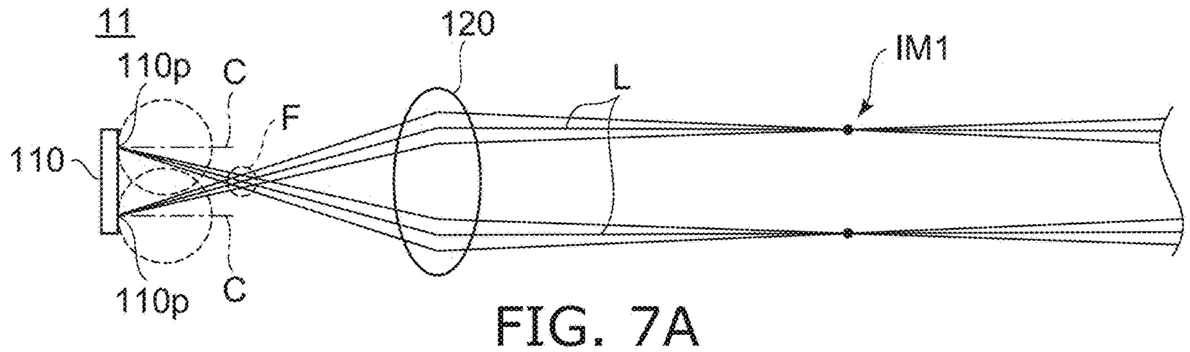
FIG. 7A is a schematic view showing the principle of the light source unit according to the first embodiment.

FIG. 7A is a schematic view showing the principle of the light source unit according to the embodiment.

Figure 7B:
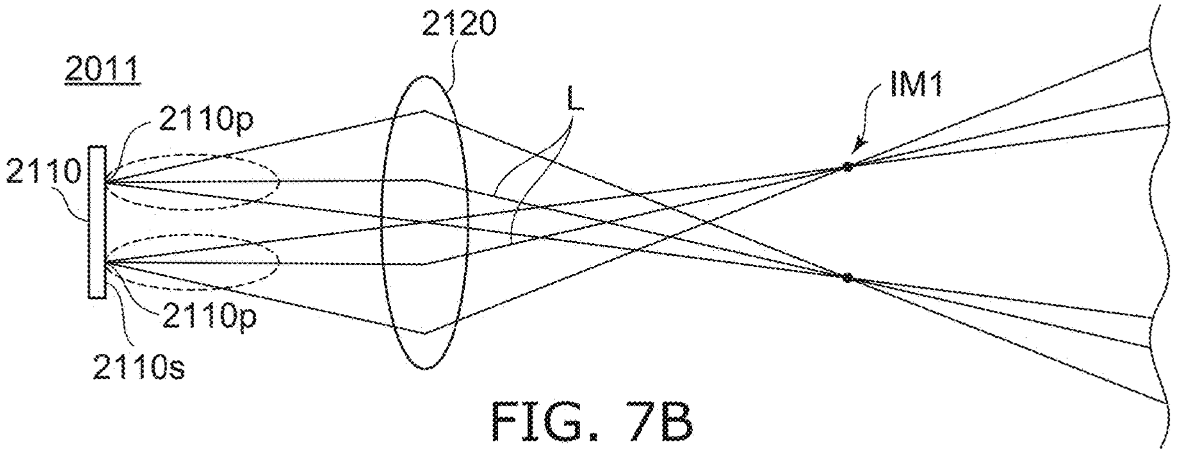
FIG. 7B is a schematic view showing the principle of a light source unit according to a reference example.

FIG. 7B is a schematic view showing the principle of a light source unit according to a reference example.

In FIG. 7A, the light distribution patterns of light emitted from two pixels 110*p* among the multiple pixels 110*p* of the display device 110 according to the embodiment are illustrated by broken lines. Similarly, in FIG. 7B, the light distribution patterns of light emitted from two pixels 2110*p* among the multiple pixels 2110*p* of a display device 2110 in the reference example are illustrated by broken lines. The illustrations of the imaging optical systems 120 and 2120 are simplified in FIGS. 7A and 7B.

In a light source unit 2011 according to the reference example as shown in FIG. 7B, a display device 2110 is an LCD (Liquid Crystal Display) that includes multiple pixels 2110*p*. As illustrated by the broken lines in FIG. 7B, the light that is emitted from each pixel 2110*p* is mainly distributed in the normal direction of a light-emitting surface 2110*s*. Also, although many planes that include the optical axis of the light emitted from one pixel 2110*p* exist, in the display device 2110 which is an LCD, the light distribution patterns of the light emitted from one pixel 2110*p* are different from each other between the planes. Also, in one plane among the multiple planes, the light that is emitted from the pixels 2110*p* has a light distribution pattern in which the luminous intensity in the direction of the angle θ with respect to the optical axis is approximated by $\cos^{20}\theta$ times the luminous intensity at the optical axis.

In such a display device 2110, the luminous intensity and/or chromaticity changes according to the viewing angle of the viewer, even when the light is emitted from the same position of the display device 2110. Accordingly, even when the luminance of the light emitted from all of the pixels 2110*p* is uniform, the luminance and/or chromaticity of the first image IM1 fluctuate if the imaging optical system 2120 receives the light emitted from the pixels 2110*p* from directions other than the normal direction. In other words, the quality of the first image IM1 degrades. Accordingly, to prevent degradation of the quality of the first image IM1, it is necessary to receive the light emitted from each pixel 2110*p* of the display device 2110 from the normal direction. As a result, the imaging optical system 2120 is larger.

In contrast, in the light source unit 11 according to the embodiment, the imaging optical system 120 is substantially telecentric at the first image IM1 side, and the light that is emitted from the display device 110 has a substantially Lambertian light distribution. Therefore, the quality of the first image IM1 can be improved while making the light source unit 11 smaller. Specifically, the display device 110 is an LED display including the multiple LED elements 112, and the light that is emitted from each LED element 112 via a wavelength conversion member 15 has a substantially Lambertian light distribution. Therefore, the dependence on the angle of the luminous intensity and/or chromaticity of the light emitted from the pixels 110*p* of the display device 110 is less than the dependence on the angle of the luminous intensity and/or chromaticity of the light emitted from the pixels 2110*p* of the display device 2110 in the reference example. In particular, as an exact Lambertian light distribution is approached, that is, as the approximation formula of the light distribution pattern approaches $\cos^n\theta$ wherein n is 1, the luminous intensity and/or chromaticity of the light emitted from each pixel 110*p* of the display device 110 is substantially uniform regardless of the angle. Therefore, as shown in FIG. 7A, even when the imaging optical system 120 receives light passing through the focal point F, that is, light from a direction other than the normal direction, the fluctuation of the luminance and/or chromaticity of the first image IM1 can be suppressed, and the quality of the first image IM1 can be improved.

Because the imaging optical system 120 forms the first image IM1 mainly of light passing through the focal point F, an increase of the light diameter of the light incident on the imaging optical system 120 can be suppressed. The input element 121 can be smaller thereby. The multiple chief rays L that are emitted from the output element 123 are substantially parallel to each other. The multiple chief rays L emitted from the output element 123 being substantially parallel to each other means that the irradiation range of the light of the output element 123 contributing to the image formation is substantially the same as the size of the first image IM1. Therefore, the output element 123 of the imaging optical system 120 also can be smaller. Thus, the light source unit 11 that is compact and can form a high-quality first image IM1 can be provided.

The image display device 10 according to the embodiment includes the light source unit 11, and the reflection unit 12 that is separated from the light source unit 11 and reflects the light emitted from the imaging optical system 120. The first image IM1 is formed between the light source unit 11 and the reflection unit 12. In such a case, the light that is emitted from one point of the display device 110 is condensed at the formation position of the first image IM1 after traveling via the output element 123. On the other hand, when the first image IM1 is not formed between the light source unit 11 and the reflection unit 12, the light diameter of the light emitted from one point of the display device 110 gradually spreads from the input element 121 toward the reflection unit 12. Accordingly, in the output element 123 according to the embodiment, the range in which the light emitted from one point of the display device 110 is irradiated can be less than when the first image IM1 is not formed. Therefore, the output element 123 can be smaller.

Because the light source unit 11 according to the embodiment is compact, the light source unit 11 can be easily located in the limited space inside the vehicle 13 when the light source unit 11 is mounted in the vehicle 13 and used as a head-up display.

According to the embodiment, the imaging optical system 120 includes the bending part 120*a* and the direction modifying part 120*b*. Thus, the design of the imaging optical system 120 is easier because the part of the imaging optical system 120 having the function of making the chief rays L parallel to each other and the part of the imaging optical system 120 forming the first image IM1 at the desired position are separate.

A portion of the optical path inside the imaging optical system 120 extends in a direction crossing the XY-plane. Therefore, the imaging optical system 120 can be somewhat smaller in directions along the XY-plane. Another portion of the optical path inside the imaging optical system 120 extends in a direction along the XY-plane. Therefore, the imaging optical system 120 can be somewhat smaller in the Z-direction.

EXAMPLES

Light source units according to examples and a reference example will now be described.

Figure 8A:
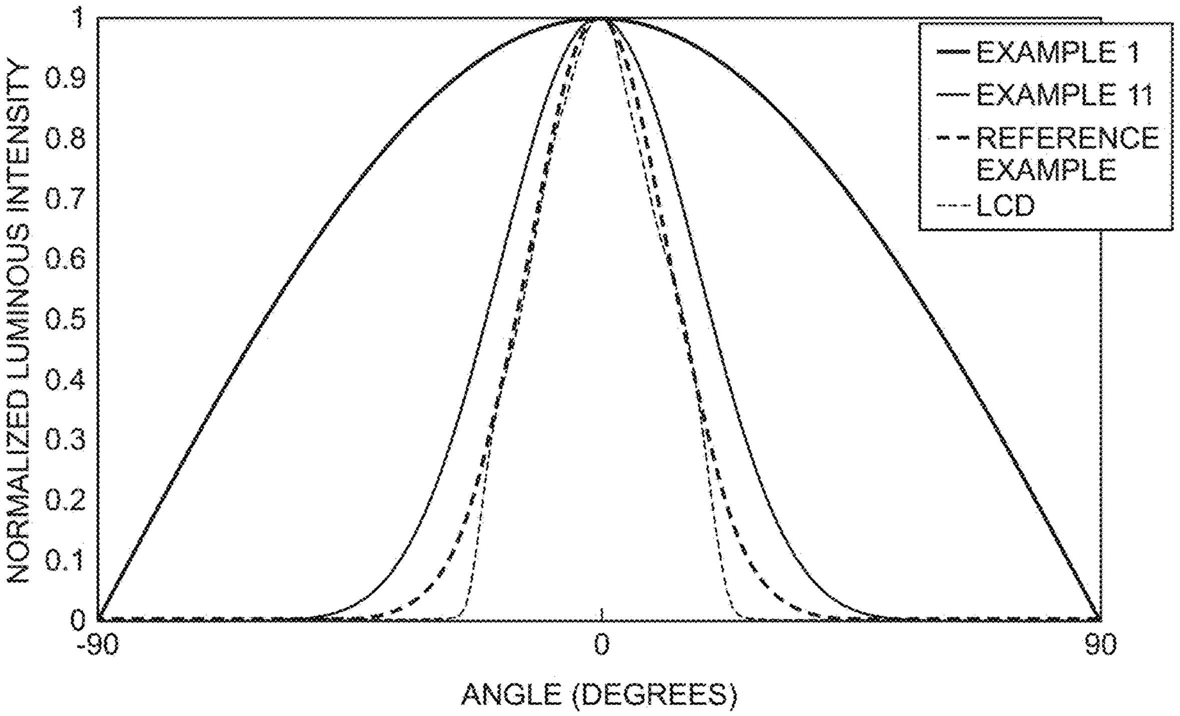
FIG. 8A is a graph showing a light distribution pattern of light emitted from one light-emitting area for examples 1 and 11 and the reference example.

FIG. 8A is a graph showing a light distribution pattern of light emitted from one light-emitting area for examples 1 and 11 and the reference example.

Figure 8B:
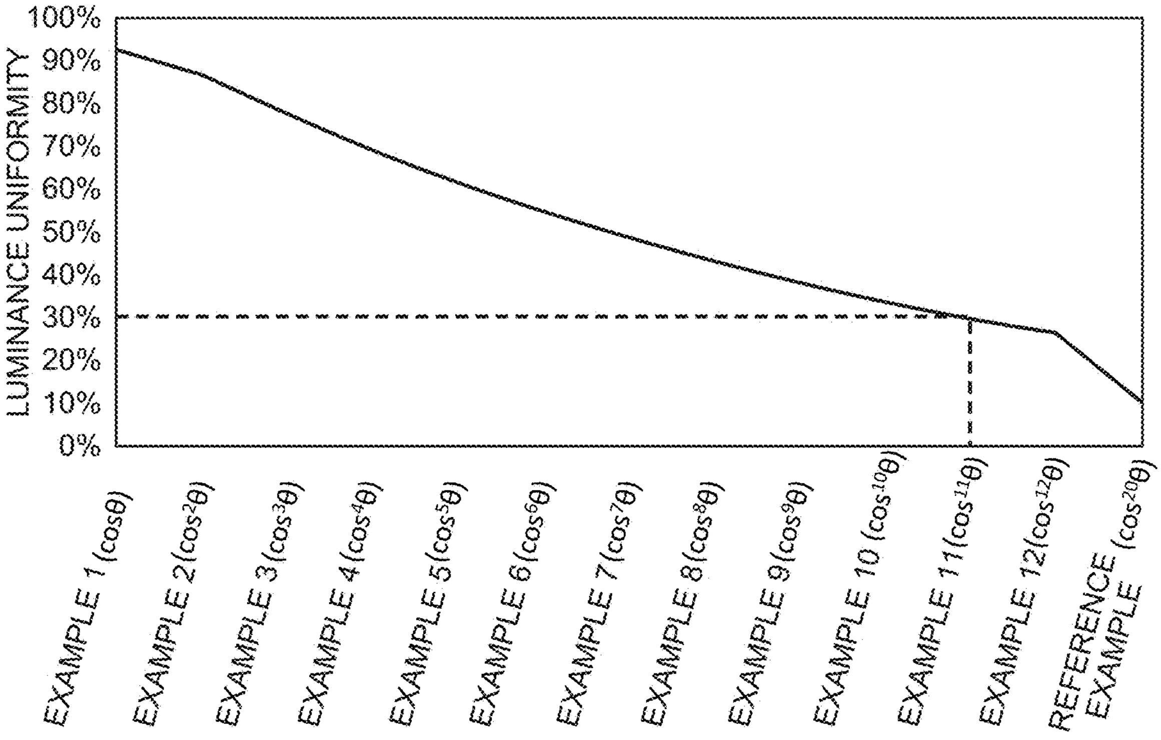
FIG. 8B is a graph showing the uniformity of the luminance of the second image for the examples 1 to 12 and the reference example.

FIG. 8B is a graph showing the uniformity of the luminance of the second image for the examples 1 to 12 and the reference example.

The image display devices according to the examples 1 to 12 and the reference example were set in simulation software to include a light source unit and a reflection unit, wherein the light source unit included multiple light-emitting areas arranged in a matrix configuration and an imaging optical system. The light-emitting areas correspond to the pixels 110*p* of the display device 110 according to the embodiment above.

In FIG. 8A, the horizontal axis is the angle with respect to the optical axis of the light-emitting area, and the vertical axis is the luminous intensity at the angle, normalized by dividing by the luminous intensity at the optical axis. As shown in FIG. 8A, the display device according to the example 1 was set in the simulation software so that the light emitted from each light-emitting area had a light distribution pattern in which the luminous intensity in the direction of the angle θ with respect to the optical axis was represented by cos θ times the luminous intensity at the optical axis. In other words, in the example 1, the light that was emitted from each light-emitting area had an exact Lambertian light distribution.

In the examples 2 to 12, the light that was emitted from each light-emitting area was set in the simulation software to have a light distribution pattern in which the luminous intensity in the direction of the angle θ with respect to the optical axis was represented by $\cos^n\theta$ times the luminous intensity at the optical axis. In the example 2, n=2, and n was set to increase by one in order from the example 2 to the example 12.

By investigating the light distribution pattern in one plane of the light emitted from the pixels of an LCD, the light distribution pattern was found to be a light distribution pattern such as that illustrated by the fine broken line of FIG. 8A. As described above, it was found that the luminous intensity in the direction of the angle θ with respect to the optical axis in the light distribution pattern can be approximated by a light distribution pattern represented by $\cos^{20}\theta$ times the luminous intensity at the optical axis. Therefore, in the reference example, the luminous intensity in the direction of the angle θ with respect to the optical axis of each light-emitting area was set in the simulation software to have the light distribution pattern represented by $\cos^{20}\theta$ times the luminous intensity at the optical axis.

The imaging optical systems of the examples 1 to 12 and the reference example each were set to be telecentric at the first image side.

Then, the luminance distribution of the second image formed when the luminance was constant for all light-emitting areas was simulated for the examples 1 to 12 and the reference example. In this case, the second image was a rectangle having a long side of 111.2 mm and a short side of 27.8 mm. Also, in this case, the plane in which the second image was formed was divided into square areas having sides of 1 mm, and the luminance value of each area was simulated.

The uniformity of the luminance of the second image was evaluated for this case. Herein, "the uniformity of the luminance" was the value of the ratio of the minimum value to the maximum value of the luminance inside the second image expressed in percent. The results are shown in FIG. 8B. In FIG. 8B, the horizontal axis is the examples and the reference example, and the vertical axis is the uniformity of the luminance.

As shown in FIG. 8B, it was found that the uniformity of the luminance degraded as n increased. This was because the luminance at positions separated from the center of the second image decreased as n increased. In particular, it was found that the uniformity of the luminance was 30% for the example 11, that is, when n=11. It is considered that it is sufficient for the uniformity of the luminance of the second image to be not less than 30% so that the viewer can easily discriminate between the second image and the regions at which the second image is not formed.

Accordingly, it was found that when the imaging optical system is configured to be substantially telecentric, it is favorable for the light emitted from the display device to have a substantially Lambertian light distribution to suppress the uneven luminance of the first and second images. Specifically, it was found that it is favorable for n of $\cos^n\theta$ which is the approximation formula of the light distribution pattern to be not more than 11, and more favorably 1. Although the uniformity of the luminance of the second image IM2 degrades as n deviates from 1 as described above, a prescribed luminance distribution can be pre-provided in the display luminance of the display device 110 to remedy such nonuniformity of the luminance. For example, when the luminance at the outer edge portion of the second image IM2 tends to be less than the luminance at the center portion due to the light emitted from the pixels 110*p* of the display device 110 traveling via the imaging optical system 120, the display device 110 may be controlled so that the outputs of the LED elements 112 of the pixels 110*p* at the outer edge vicinity of the display device 110 are greater than the outputs of the LED elements 112 of the pixels 110*p* at the center.

First Modification of First Embodiment

Figure 9A:
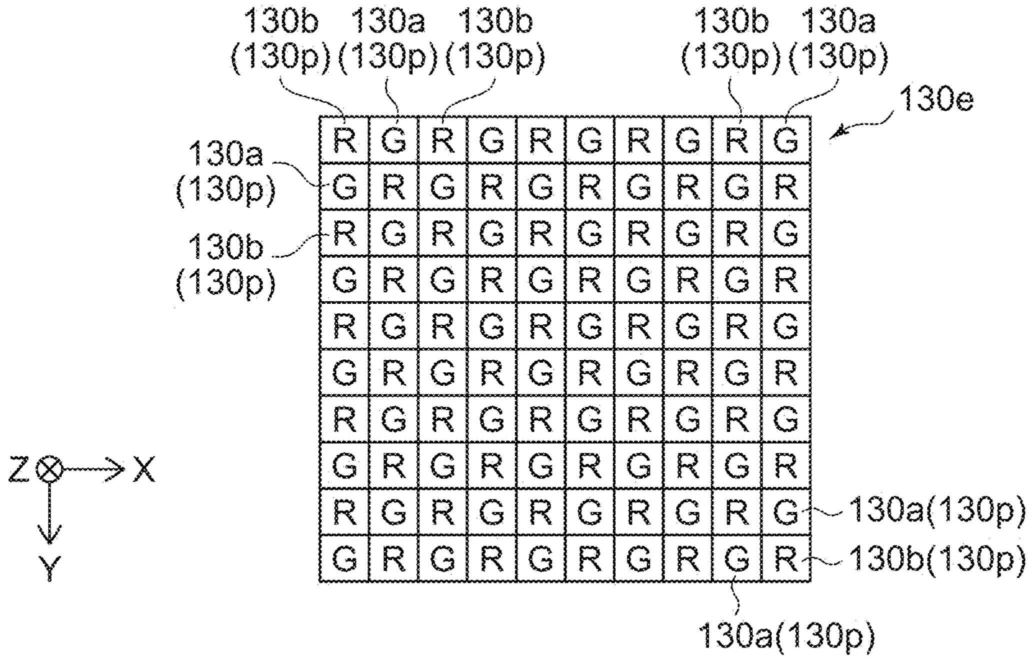
FIG. 9A is a plan view showing a color change sheet of a light source unit according to a first modification of the first embodiment.

A first modification of the first embodiment will now be described. FIG. 9A is a plan view showing the color change sheet of the light source unit according to the modification.

Figure 9B:
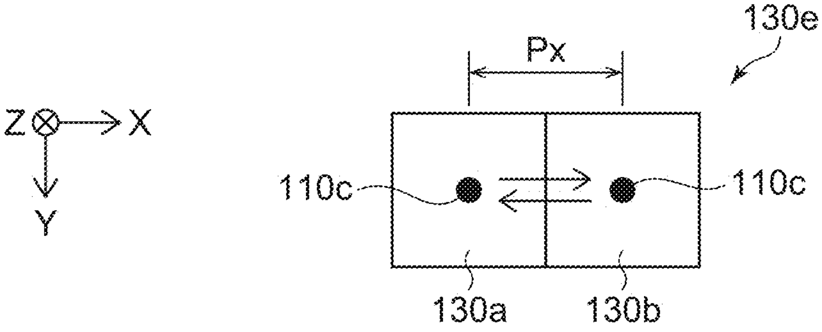
FIGS. 9B and 9C are plan views showing changes of the positional relationship of the pixels of the display device and the regions of the color change sheet according to the first modification of the first embodiment.
Figure 9C:
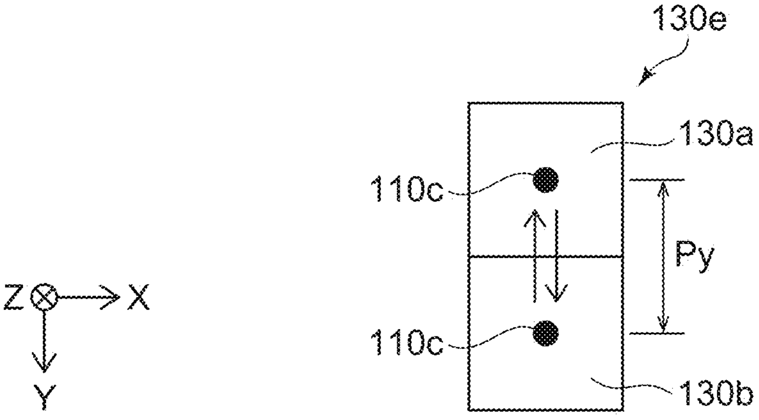

FIGS. 9B and 9C are plan views showing changes of the positional relationship of the pixels of the display device and the regions of the color change sheet according to the modification.

Although an example is described in the first embodiment above in which white light is emitted from the pixels 110*p* of the display device 110, light of the colors of blue, green, and red is emitted from the color change sheet 130, according to an example of the modification, light of the two colors of green and red is emitted from a color change sheet 130*e*.

As shown in FIG. 9A, in a color change sheet 130*e* according to the modification as well, the multiple regions 130*p* are arranged in a matrix configuration along the first and second directions. The regions 130*p* include the two types of the first and second regions 130*a* and 130*b*. The first region 130*a* and the second region 130*b* are alternately arranged along the first direction (the X-direction) and the second direction (the Y-direction).

According to the modification, the first region 130*a* includes a green film, and the first color is green. The second region 130*b* includes a red film, and the second color is red. In other words, white light from the pixels 110*p* of the display device 110 is incident on the first region 130*a*. The first region 130*a* transmits the green component of the white light, and shields the other components. Accordingly, the first region 130*a* emits green light. White light from the pixels 110*p* is incident on the second region 130*b*. The second region 130*b* transmits the red component of the white light, and shields the other components. Accordingly, the second region 130*b* emits red light.

As shown in FIG. 9B, when referenced to the color change sheet 130*e*, the center 110*c* of one pixel 110*p* moves between the center of the first region 130*a* and the center of the second region 130*b* along the X-direction. The movement amount of the center 110*c* of the pixel 110*p* is Px along the X-direction. Or, as shown in FIG. 9C, the drive unit 140 may move the color change sheet 130*e* along the Y-direction. In such a case, the movement amount of the center 110*c* of the pixel 110*p* is Py along the Y-direction.

According to the modification, when only the two colors of green and red are necessary to display the image, the light source unit can be smaller than that of the first embodiment. Also, compared to the first embodiment, the luminance of the image is improved because the time that the region 130*p* of the desired color is located directly above the one pixel 110*p* lengthens. Otherwise, the configuration, operations, and effects according to the modification are similar to those of the first embodiment.

Second Modification of First Embodiment

A second modification of the first embodiment will now be described.

Figure 10:
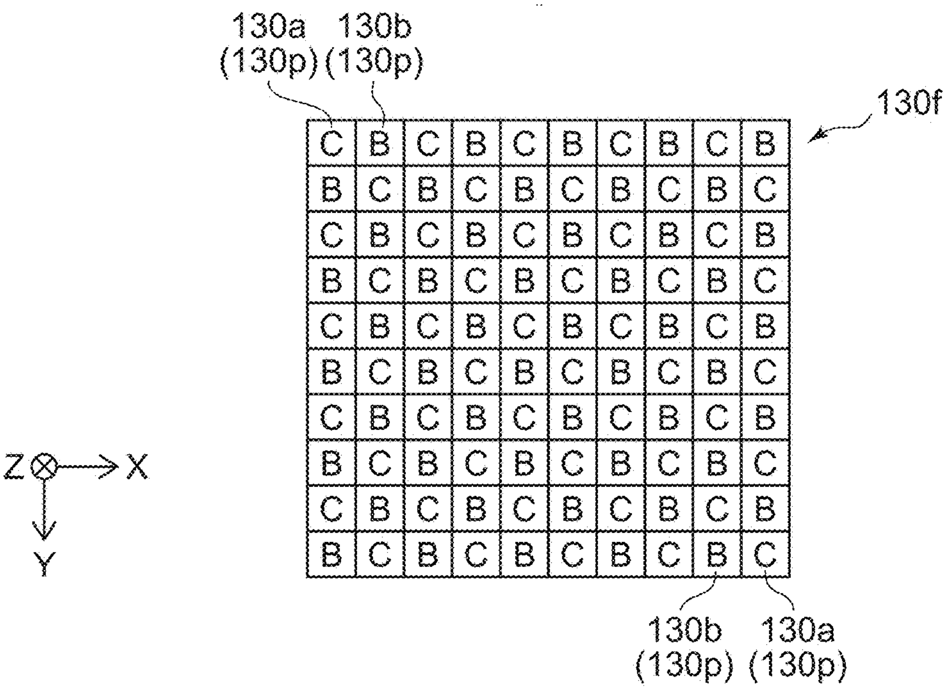
FIG. 10 is a plan view showing a color change sheet of a light source unit according to a second modification of the first embodiment.

FIG. 10 is a plan view showing a color change sheet of a light source unit according to the modification.

An example is described in the modification in which a transparent region is included in a color change sheet 130*f*.

As shown in FIG. 10, in the color change sheet 130*f* according to the modification as well, the first region 130*a* and the second region 130*b* are alternately arranged along the first direction (the X-direction) and the second direction (the Y-direction).

According to the modification, the first region 130*a* includes a transparent film. Therefore, the first region 130*a* transmits the white light emitted from the pixels 110*p* of the display device 110 substantially as-is. Accordingly, the first color is white. The first region 130*a* may be an opening without including a transparent film. The second region 130*b* includes a blue film, and the second color is blue. In FIG. 10, the transparent first regions 130*a* are marked with the character "C."

According to the modification, a two-color image of white and blue can be displayed. The second region 130*b* may include a green film or a red film. In these cases, the second color is green or red. Otherwise, the configuration, operations, and effects according to the modification are similar to those of the first modification.

Second Embodiment

A second embodiment will now be described.

Figure 11:
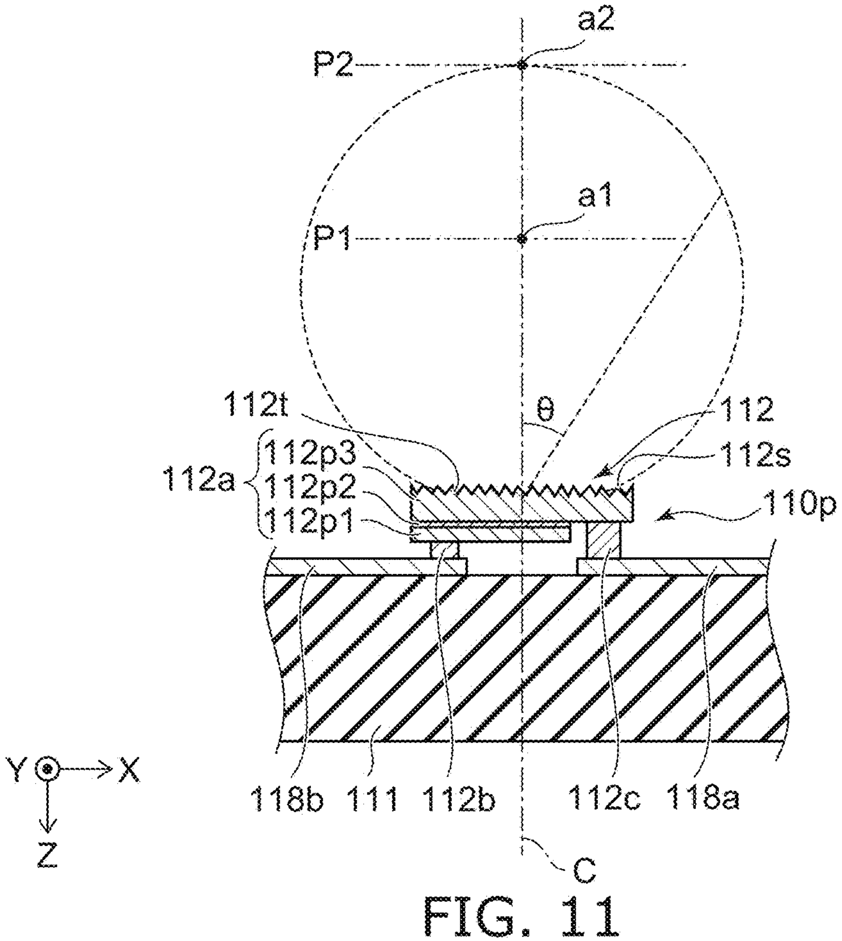
FIG. 11 is an end view showing a display device of an image display device according to a second embodiment.

FIG. 11 is an end view showing a display device of an image display device according to the embodiment.

Figure 12:
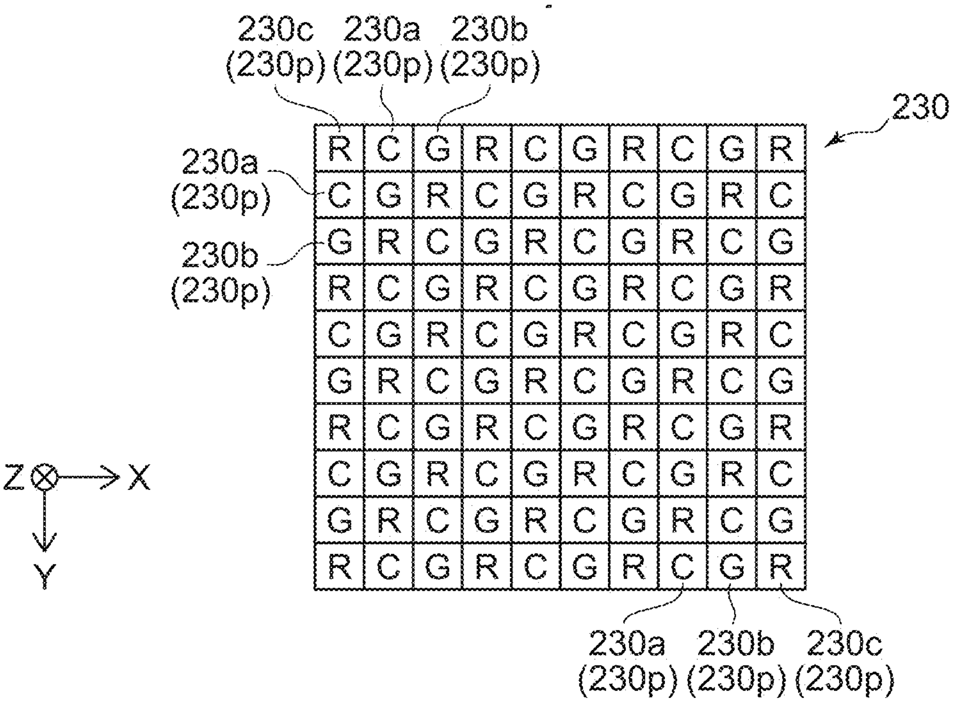
FIG. 12 is a plan view showing a color change sheet of the light source unit according to the second embodiment.

FIG. 12 is a plan view showing a color change sheet of the light source unit according to the embodiment.

Although an example is described in the first embodiment above in which white light is emitted from the pixels 110*p* of the display device 110 and the color change sheet 130 is a color film, according to the example of the embodiment, blue light is emitted from the pixels 110_p_ of the display device 110, and a color change sheet 230 is a fluorescer sheet.

According to the embodiment as shown in FIG. 11, the wavelength conversion member 115 is not included in the display device 110, and multiple recesses 112_t_ are provided in the light-emitting surface 112_s_ of the LED element 112. As a result, the light that is emitted from the LED element 112 has a substantially Lambertian light distribution. The LED element 112 emits blue light. Accordingly, blue light is emitted from the pixel 110_p_.

According to the embodiment as shown in FIG. 12, the color change sheet 230 includes multiple regions 230_p_. The shapes, sizes, and arrangement period of the regions 230_p_ are substantially the same as the shapes, sizes, and arrangement period of the pixels 110_p_ of the display device 110. The regions 230_p_ include a first region 230_a_, a second region 230_b_, and a third region 230_c_.

The first region 230_a_ includes a transparent film. Blue light from the pixels 110_p_ of the display device 110 is incident on the first region 230_a_. The first region 230_a_ transmits the blue light and emits the blue light substantially as-is. Accordingly, the light that is emitted from the first region 230_a_ is blue light, and the first color is blue.

The second region 230_b_ includes a fluorescer layer. The second region 230_b_ includes a fluorescer that absorbs the light emitted from the pixels 110_p_ and radiates green light. As a result, the blue light from the pixels 110_p_ of the display device 110 is incident on the second region 230_b_, and the fluorescer absorbs the blue light and radiates green light. Accordingly, the second color is green. The light that is emitted from the second region 230_b_ has a substantially Lambertian light distribution.

The third region 230_c_ also includes a fluorescer layer. The third region 230_c_ includes a fluorescer that absorbs the light emitted from the pixels 110_p_ and radiates red light. As a result, the blue light from the pixels 110_p_ of the display device 110 is incident on the third region 230_c_, and the fluorescer absorbs the blue light and radiates red light. Accordingly, the third color is red. The light that is emitted from the third region 230_c_ also has a substantially Lambertian light distribution.

According to the embodiment, the blue light that is emitted from the LED elements 112 is incident on the first region 230_a_ of the color change sheet 230. The utilization efficiency of the light is high because the first region 230_a_ transmits and emits the incident blue light as-is. Otherwise, the configuration, operations, and effects according to the embodiment are similar to those of the first embodiment.

First Modification of Second Embodiment

A first modification of the second embodiment will now be described.

Figure 13:
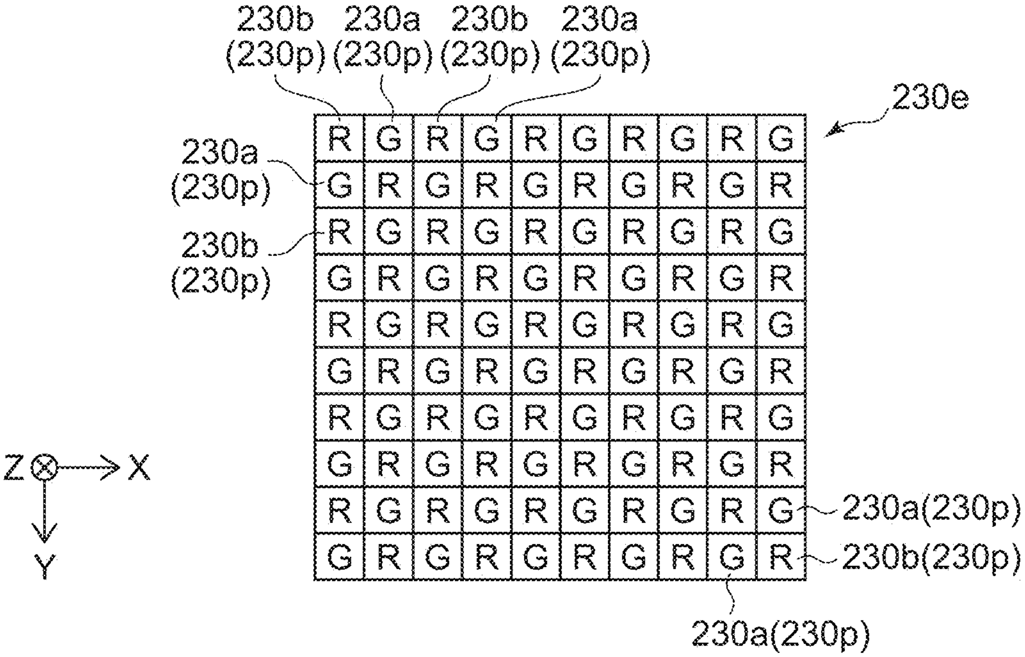
FIG. 13 is a plan view showing a color change sheet of a light source unit according to a first modification of the second embodiment.

FIG. 13 is a plan view showing a color change sheet of a light source unit according to the modification.

Although an example is described in the second embodiment in which blue light is emitted from the pixels 110_p_ of the display device 110 and light of the colors of blue, green, and red is emitted from the color change sheet 230, in the example according to the modification, blue light is emitted from the pixels 110_p_, and light of the two colors of green and red is emitted from a color change sheet 230_e_.

As shown in FIG. 13, in the color change sheet 230_e_ according to the modification as well, the first region 230_a_ and the second region 230_b_ are alternately arranged along the first direction (the X-direction) and the second direction (the Y-direction). The first region 230_a_ and the second region 230_b_ include fluorescer layers. The first region 230_a_ includes a fluorescer that absorbs blue light and radiates green light. The second region 230_b_ includes a fluorescer that absorbs blue light and radiates red light. Accordingly, according to the modification, the first color is green, and the second color is red. According to the modification, the operation of the drive unit 140, i.e., the change of the positional relationship between the display device 110 and the color change sheet 230_e_, is as shown in FIG. 9B or FIG. 9C.

According to the modification, when only the two colors of green and red are necessary to display the image, the light source unit can be smaller than that of the second embodiment. Compared to the second embodiment, the luminance of the image is improved because the time that the region 230_p_ of the desired color is located directly above one pixel 110_p_ lengthens. Otherwise, the configuration, operations, and effects according to the modification are similar to those of the second embodiment.

Second Modification of Second Embodiment

A second modification of the second embodiment will now be described.

Figure 14:
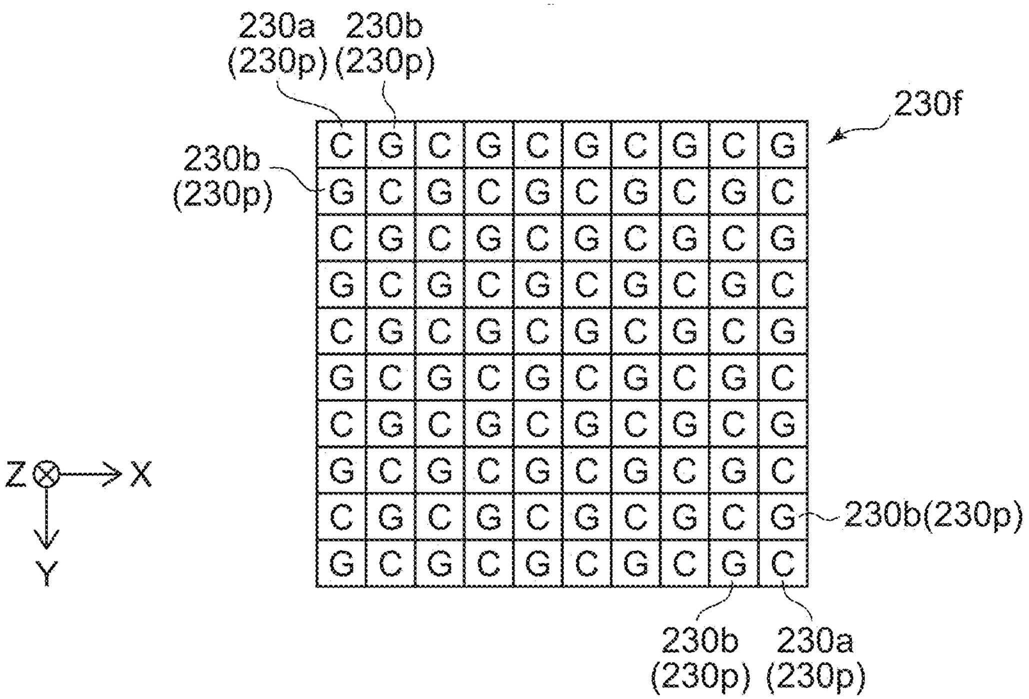
FIG. 14 is a plan view showing a color change sheet of a light source unit according to a second modification of the second embodiment.

FIG. 14 is a plan view showing a color change sheet of a light source unit according to the modification.

An example is described in the modification in which a transparent region is included in a color change sheet 230_f_.

In the color change sheet 230_f_ according to the modification as shown in FIG. 14, the first region 230_a_ includes a transparent film. Therefore, the first region 230_a_ transmits the blue light emitted from the pixels 110_p_ of the display device 110 substantially as-is. Therefore, the first region 230_a_ emits blue light. Accordingly, the first color is blue. The first region 230_a_ may be an opening without including a transparent film. The second region 230_b_ includes a fluorescer layer, and includes a fluorescer that absorbs blue light and radiates green light. Accordingly, the second color is green.

According to the modification, a two-color image of blue and green can be displayed. The second region 230_b_ may include a fluorescer that absorbs blue light and radiates green light, may include a fluorescer that absorbs blue light and radiates red light, or may include a fluorescer that absorbs blue light and radiates yellow light. In such cases, the second color is respectively green, red, or yellow. Otherwise, the configuration, operations, and effects according to the modification are similar to the first modification of the second embodiment.

Third Embodiment

A third embodiment will now be described.

Figure 15:
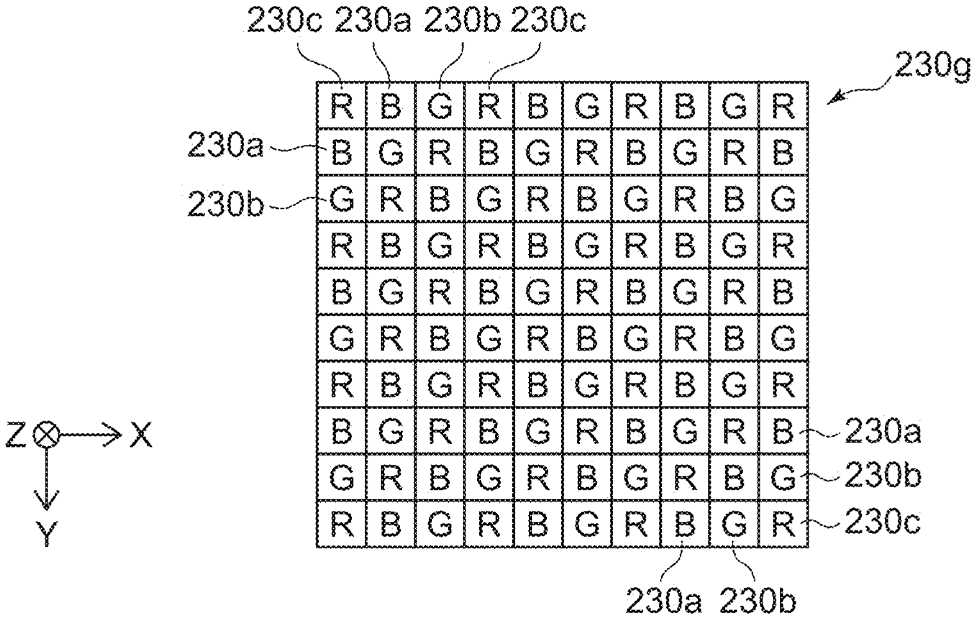
FIG. 15 is a plan view showing a color change sheet of a light source unit according to a third embodiment.

FIG. 15 is a plan view showing a color change sheet of a light source unit according to the embodiment.

Although an example is described in the second embodiment above in which blue light is emitted from the pixels 110_p_ of the display device 110, according to the example of the embodiment, ultraviolet is emitted from the pixels 110_p_ of the display device 110.

According to the embodiment as shown in FIG. 15, a color change sheet 230_g_ includes the first region 230_a_, the second region 230_b_, and the third region 230_c_. The first region 230_a_, the second region 230_b_, and the third region 230_c_ each include fluorescer layers. The first region 230_a_ includes a fluorescer that absorbs ultraviolet and emits blue light. Accordingly, the first color is blue. The second region 230*b* includes a fluorescer that absorbs ultraviolet and radiates green light. Accordingly, the second color is green. The third region 230*c* includes a fluorescer that absorbs ultraviolet and radiates red light. Accordingly, the third color is red. The light that is emitted from the first, second, and third regions 230*a*, 230*b*, and 230*c* has a substantially Lambertian light distribution.

According to the embodiment, the color selectivity is high because all colors can be modulated by the fluorescers. Otherwise, the configuration, operations, and effects according to the embodiment are similar to those of the second embodiment.

Modification of Third Embodiment

A modification of the third embodiment will now be described.

Figure 16:
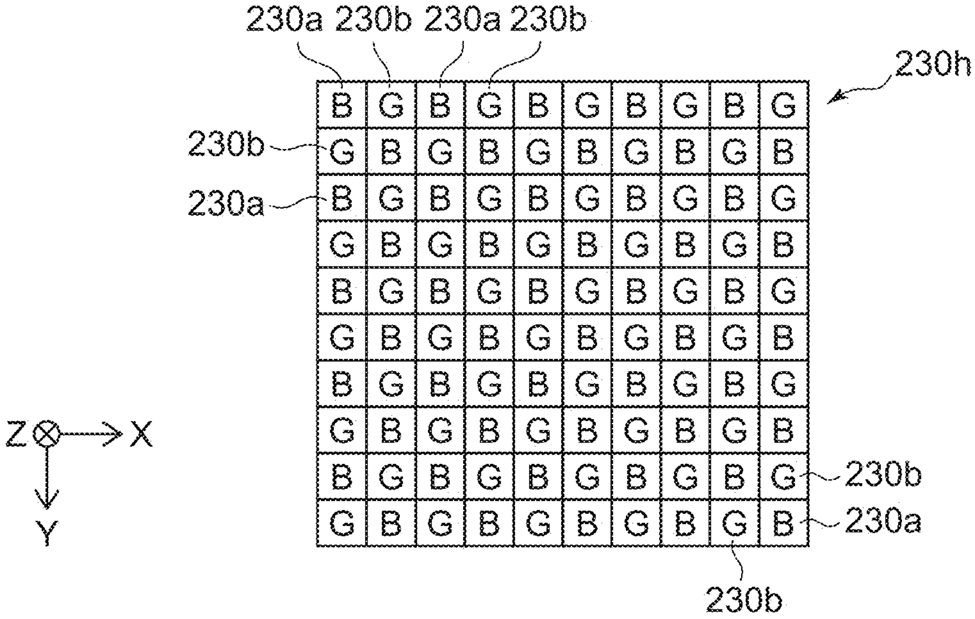
FIG. 16 is a plan view showing a color change sheet of a light source unit according to a modification of the third embodiment.

FIG. 16 is a plan view showing a color change sheet of a light source unit according to the modification.

Although an example is described in the third embodiment in which ultraviolet is emitted from the pixels 110*p* of the display device 110 and light of the colors of blue, green, and red is emitted from the color change sheet 230*g*, an example is described in the modification in which light of two colors is emitted from a color change sheet 230*h*.

In a color change sheet 230*h* according to the modification as shown in FIG. 16, similarly to the color change sheet shown in FIG. 13, the first region 230*a* and the second region 130*b* are alternately arranged along the first direction (the X-direction) and the second direction (the Y-direction). The first region 230*a* includes a fluorescer that absorbs ultraviolet and radiates light of the first color. The second region 230*b* includes a fluorescer that absorbs ultraviolet and radiates light of the second color. In the example shown in FIG. 16, the first color is blue, and the second color is green.

The combination of the first and second colors is not limited to blue and green, and may be, for example, blue and red, blue and yellow, or green and red. According to the modification, the operation of the drive unit 140, i.e., the change of the positional relationship between the display device 110 and the color change sheet 230*h*, is as shown in FIG. 9B or FIG. 9C.

According to the modification, when only two colors are necessary in the display of the image, the light source unit can be smaller than that of the third embodiment. Compared to the third embodiment, the luminance of the image is improved. Otherwise, the configuration, operations, and effects according to the modification are similar to those of the third embodiment.

FIG. 17 shows the relationship between the color of the light emitted from the pixels of the display device and the configurations of the regions of the color change sheet.

As shown in FIG. 17, examples are described in the first to third embodiments and their modifications described above in which the light emitted from the pixels 110*p* of the display device 110 is white light, blue light, or ultraviolet, and the regions of the color change sheet are colored or transparent films, or fluorescer layers that radiate colored light.

However, the invention is not limited to the examples shown in FIG. 17. For example, the color of the light emitted from the color change sheet is not limited to white, blue, green, red, and yellow, and may be another color such as orange, pink, cyan, magenta, etc. The number of colors of the light emitted from the color change sheet is not limited to two or three colors, and may be four or more colors.

Fourth Embodiment

A fourth embodiment will now be described.

Figure 18:
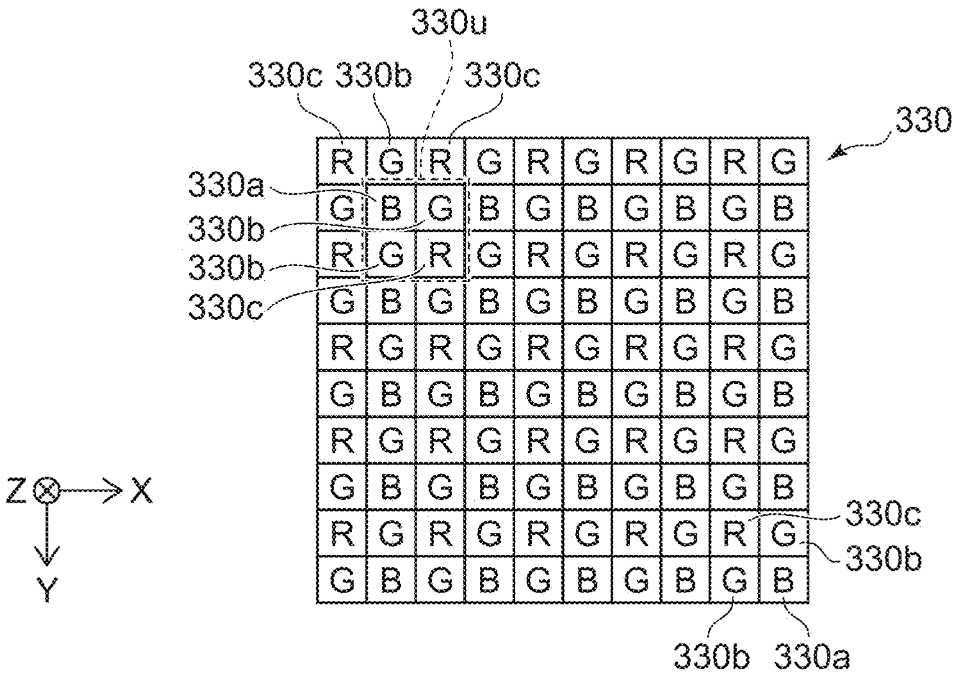
FIG. 18 is a plan view showing a color change sheet of a light source unit according to a fourth embodiment.

FIG. 18 is a plan view showing a color change sheet of a light source unit according to the embodiment.

In a color change sheet 330 according to the embodiment as shown in FIG. 18, in a minimum unit 330*u* of two adjacent rows and two adjacent columns, second regions 330*b* that emit green light are located at the two opposite corners, and one first region 330*a* that emits blue light and one third region 330*c* that emits red light are included. The color change sheet 330 may include a color film as in the first embodiment, may include a fluorescer sheet as in the second and third embodiments, or may include a transparent region.

According to the embodiment, the operation of the drive unit 140, i.e., the change of the positional relationship between the display device 110 and the color change sheet 330, is as shown in FIG. 5C. As a result, for example, the region that is located directly above one pixel 110*p* repeatedly changes in the order of first region 330*a* (blue)→second region 330*b* (green)→third region 330*c* (red)→second region 330*b* (green). Otherwise, the configuration, operations, and effects according to the embodiment are similar to those of the first embodiment.

Fifth Embodiment

A fifth embodiment will now be described.

Figure 19:
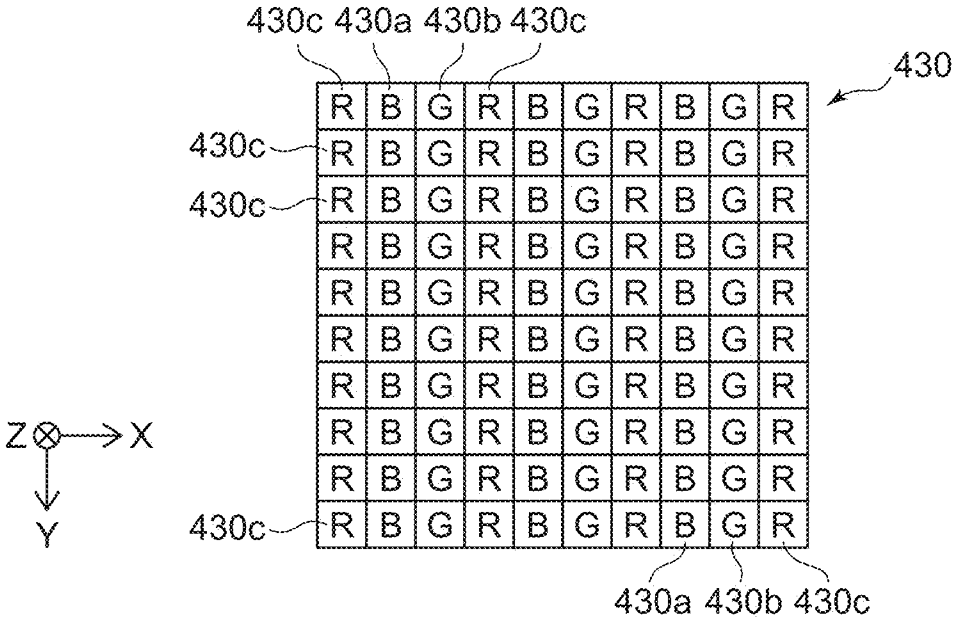
FIG. 19 is a plan view showing a color change sheet of a light source unit according to a fifth embodiment.

FIG. 19 is a plan view showing a color change sheet of a light source unit according to the embodiment.

In a color change sheet 430 according to the embodiment as shown in FIG. 19, a first region 430*a*, a second region 430*b*, and a third region 430*c* are repeatedly arranged along the first direction (the X-direction). On the other hand, the same type of region is consecutively arranged along the second direction (the Y-direction). According to the embodiment, the operation of the drive unit 140, i.e., the change of the positional relationship between the display device 110 and the color change sheet 430, is as shown in FIG. 5A. Otherwise, the configuration, operations, and effects according to the embodiment are similar to those of the first embodiment.

Sixth Embodiment

A sixth embodiment will now be described.

Figure 20:
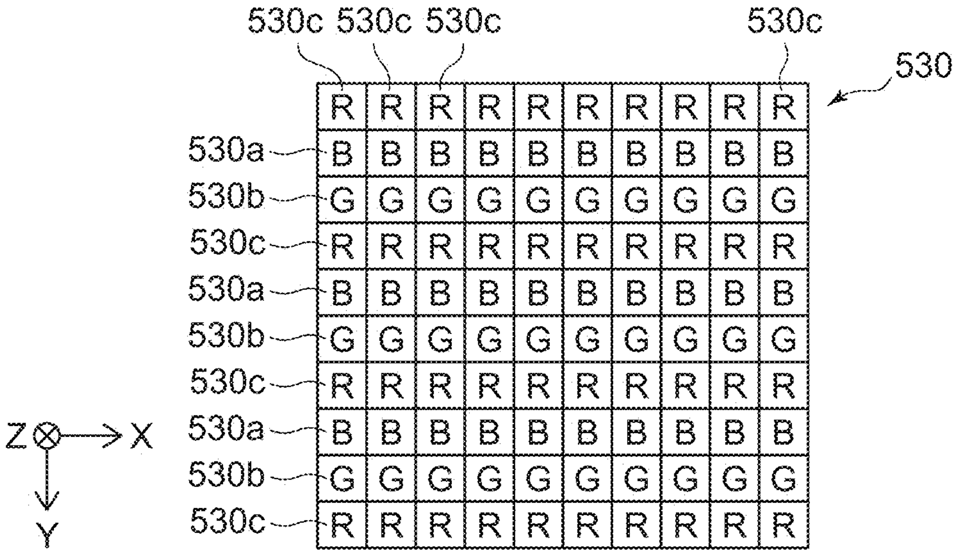
FIG. 20 is a plan view showing a color change sheet of a light source unit according to a sixth embodiment.

FIG. 20 is a plan view showing a color change sheet of a light source unit according to the embodiment.

In a color change sheet 530 according to the embodiment as shown in FIG. 20, a first region 530*a*, a second region 530*b*, and a third region 530*c* are repeatedly arranged along the second direction (the Y-direction). On the other hand, the same type of region is consecutively arranged along the first direction (the X-direction). According to the embodiment, the operation of the drive unit 140, i.e., the change of the positional relationship between the display device 110 and the color change sheet 530, is as shown in FIG. 5B. Otherwise, the configuration, operations, and effects according to the embodiment are similar to those of the first embodiment.

Seventh Embodiment

A seventh embodiment will now be described.

Figure 21:
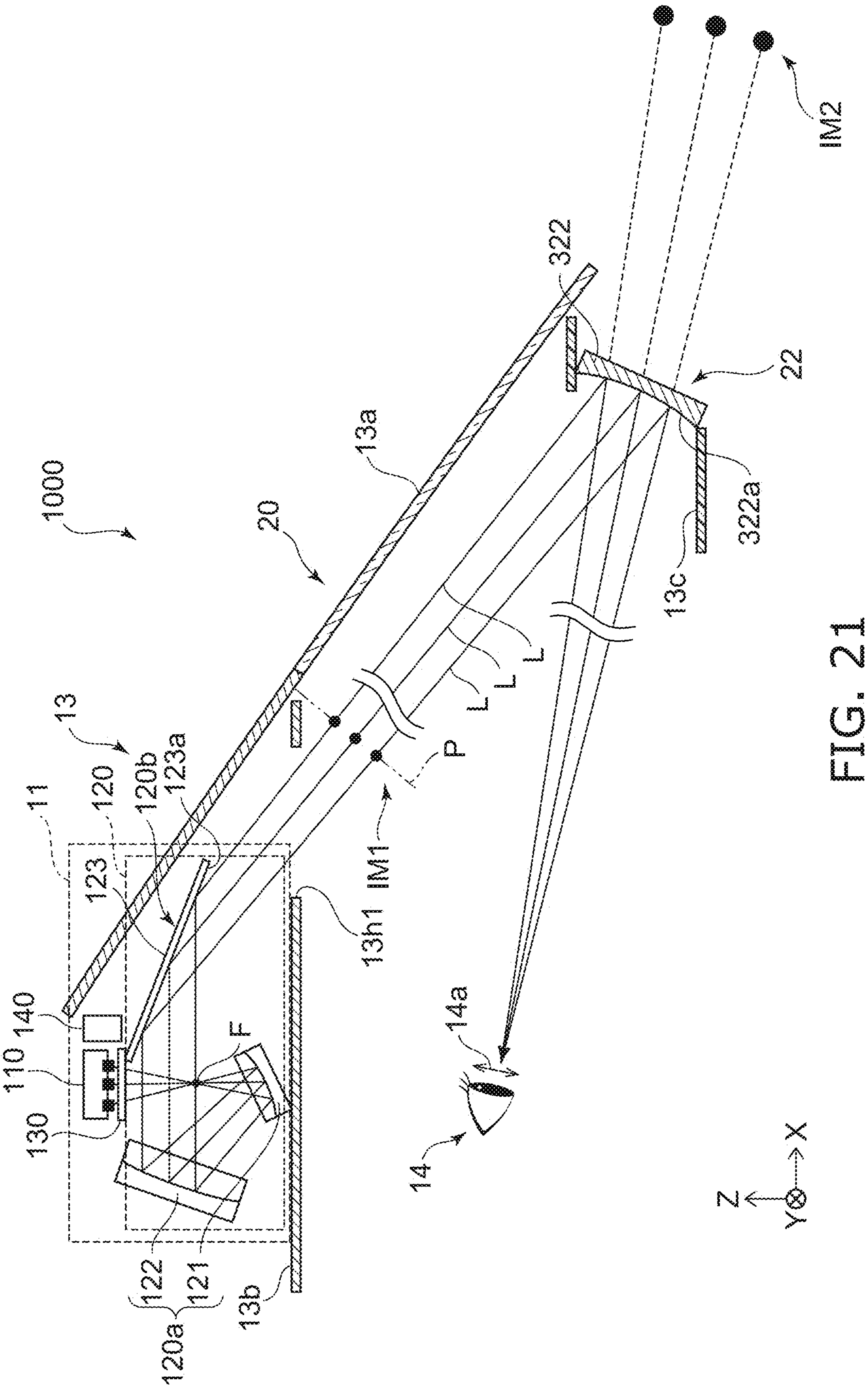
FIG. 21 is an end view showing an image display device according to a seventh embodiment.

FIG. 21 is an end view showing an image display device according to the embodiment.

Figure 22:
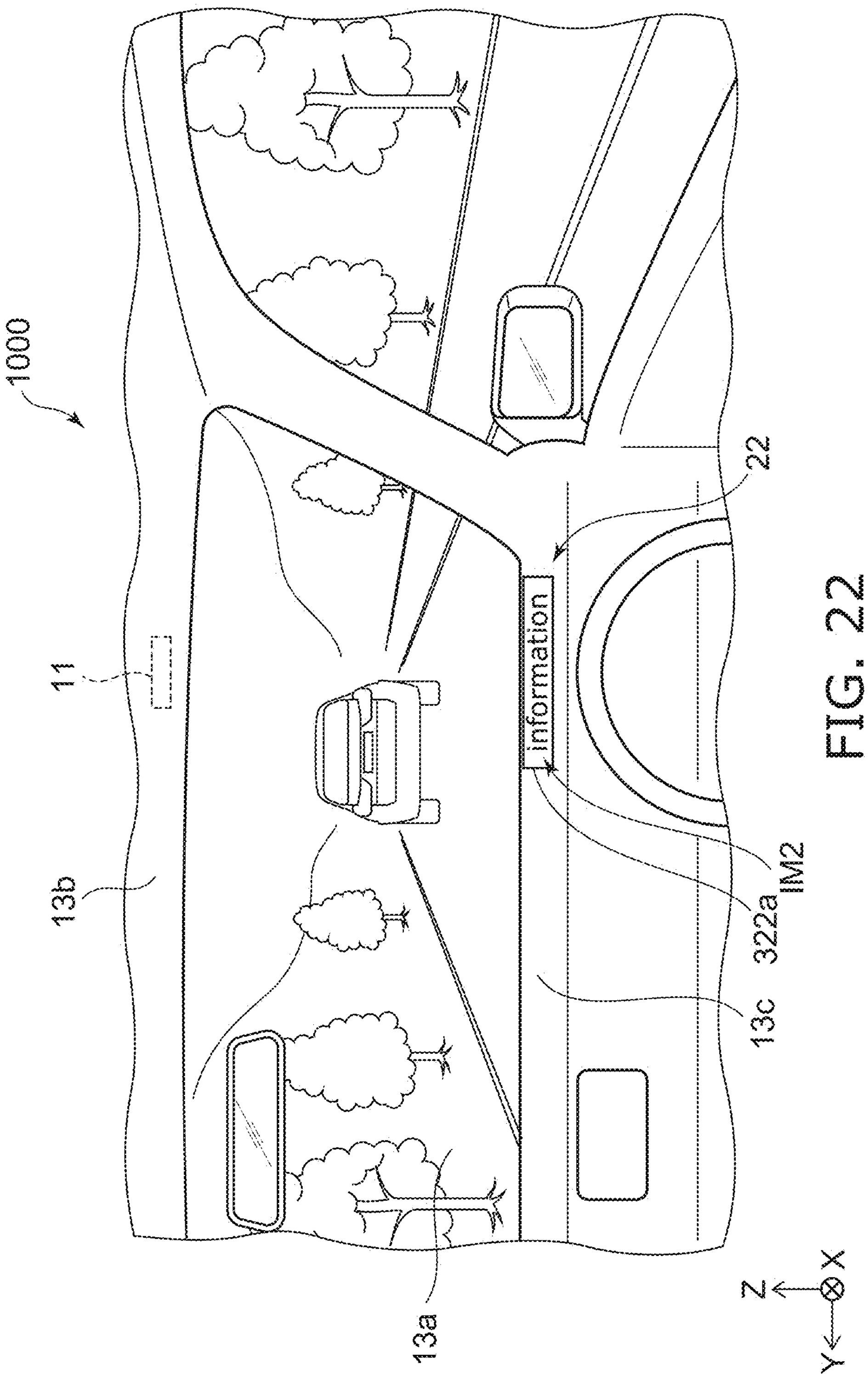
FIG. 22 is a schematic view showing a scenery when viewed by a viewer in a driver's seat according to the seventh embodiment.

FIG. 22 is a schematic view showing a scenery when viewed by a viewer in a driver's seat according to the embodiment.

As shown in FIG. 21, the automobile 1000 according to the embodiment includes the vehicle 13, and an image display device 20 fixed to the vehicle 13. The image display device 20 includes the light source unit 11 and a reflection unit 22. The image display device 20 according to the embodiment differs from the image display device 10 according to the first embodiment in that a mirror surface 322*a* of a mirror 322 of the reflection unit 22 also is used as a reflecting surface causing the viewer 14 to view the second image IM2.

The configuration of the light source unit 11 of the image display device 20 is similar to that of the first embodiment. The light source unit 11 is located at the ceiling part 13*b* of the vehicle 13. The reflection unit 22 is located at the dashboard part 13*c* of the vehicle 13. The reflection unit 22 includes the mirror 322. The mirror surface 322*a* of the mirror 322 is, for example, a concave surface. The mirror surface 322*a* is arranged at a position and angle facing the eyebox 14*a* of the viewer 14 when the viewer 14 is in the driver's seat of the vehicle 13. For example, the mirror surface 322*a* faces a direction between the −X direction (the back) and the +Z direction (up). The angle of the mirror surface 322*a* can be finely adjusted according to the position of the eyebox 14*a* of the viewer 14.

The operation of the embodiment will now be described.

The chief rays L that are emitted from the light source unit 11 travel in a direction between the +X direction (the front) and the −Z direction (the lower side), are reflected by the mirror surface 322*a* of the mirror 322 of the reflection unit 22, travel in a direction between the −X direction (the back) and the +Z direction (up), and enter the eyebox 14*a* of the viewer 14. The path of the chief rays L from the light source unit 11 toward the reflection unit 12 is positioned inward of the front windshield 13*a* of the vehicle 13 and is substantially along the front windshield 13*a*. The chief rays L form the first image IM1 at the position P between the light source unit 11 and the reflection unit 22. At this time, the first image IM1 is a color image including multiple colors due to the time-division control of the display device 110 by the drive unit 140 changing the positional relationship between the display device 110 and the color change sheet 130.

As a result, as shown in FIGS. 21 and 22, the viewer 14 can view the second image IM2, which is a virtual image, depthward of the mirror surface 322*a* of the dashboard part 13*c*. The second image IM2 is formed distant to, e.g., 3 m in front of, the mirror surface 322*a*. Therefore, the viewer 14 can view the second image IM2 without greatly moving the focal length of the eyes from the state of viewing the distant scenery via the front windshield 13*a*.

Effects of the embodiment will now be described.

Similarly to the first embodiment, the image display device 20 according to the embodiment is divided into the light source unit 11 and the reflection unit 22 and fixed at separate positions in the vehicle 13. Although the image display device 20 requires a long optical path length to form the second image IM2 at a position several meters frontward, by separating the light source unit 11 and the reflection unit 22, a portion of the optical path length can be formed by utilizing the internal space of the vehicle 13. As a result, it is unnecessary to form the necessary optical path length entirely inside the image display device 20, and the image display device 20 can be smaller.

In the image display device 20, the reflection unit 22 includes only the mirror 322. As a result, the configuration of the reflection unit 22 can be simplified, and the reflection unit 22 can be smaller.

By using the mirror surface 322*a* located in the dashboard part 13*c* as the reflecting surface, the viewer 14 can reliably view the second image IM2 without being affected by the background of the reflecting surface. Otherwise, the configuration, operations, and effects according to the embodiment are similar to those of the first embodiment.

The mirror 322 of the reflection unit 22 may include a half mirror or a transparent plate. In such a case as well, the viewer 14 can be prevented from undesirably viewing the interior of the dashboard part 13*c* by making the interior of the dashboard part 13*c* dark. Or, the mirror surface 322*a* of the mirror 322 may be black enough to sufficiently reflect the chief rays L emitted from the light source unit 11. As a result, degradation of the visibility due to external light or the like reflected by the mirror surface 322*a* of the mirror 322 can be suppressed. The mirror 322 may be arranged to be continuous with the surface of the dashboard part 13*c*. As a result, it is unnecessary to make a hole in the dashboard part 13*c*, and the designability of the interior of the automobile 1000 is improved.

Eighth Embodiment

An eighth embodiment will now be described.

Figure 23:
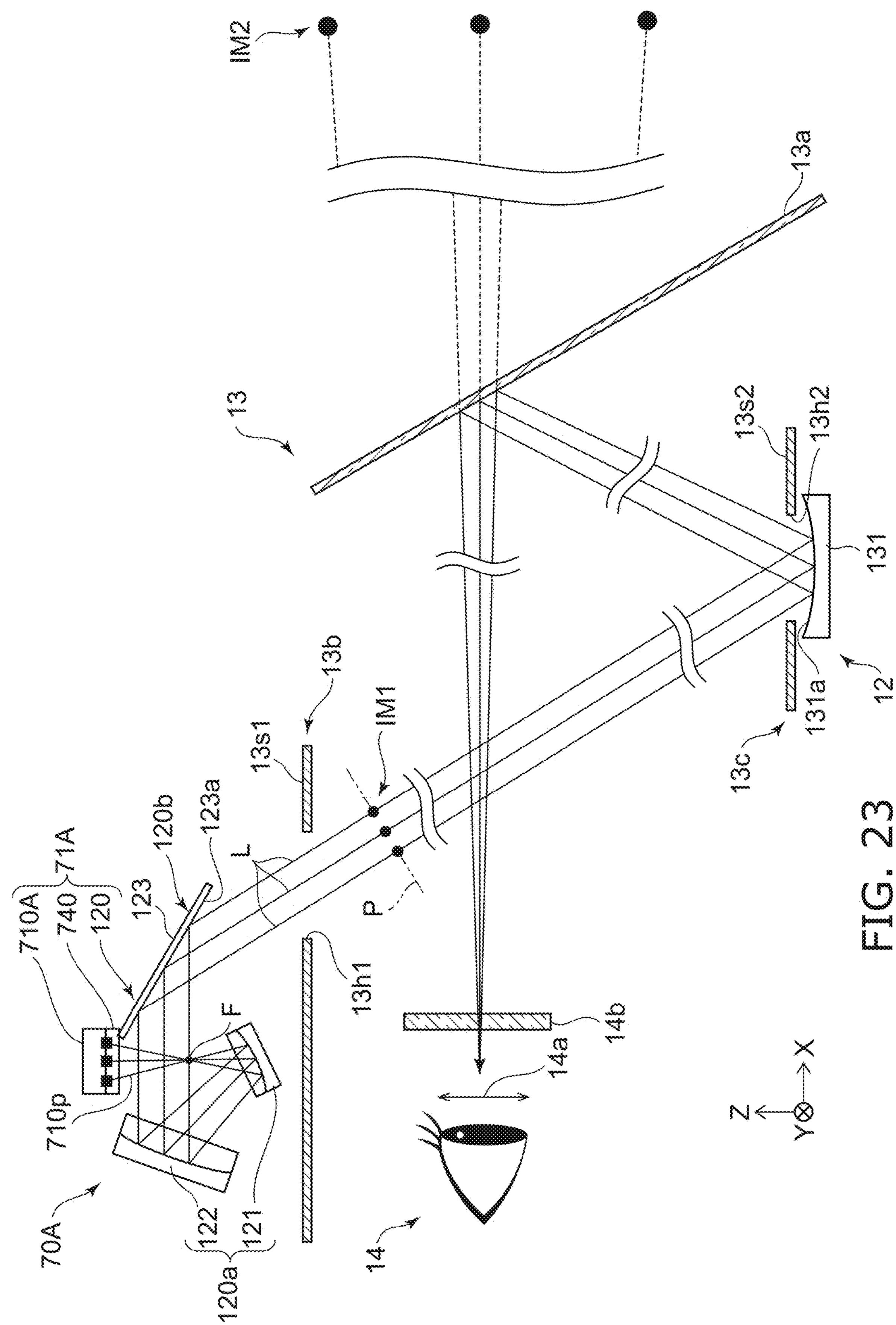
FIG. 23 is an end view showing an image display device according to an eighth embodiment.

FIG. 23 is an end view showing an image display device according to the embodiment.

Figure 24:
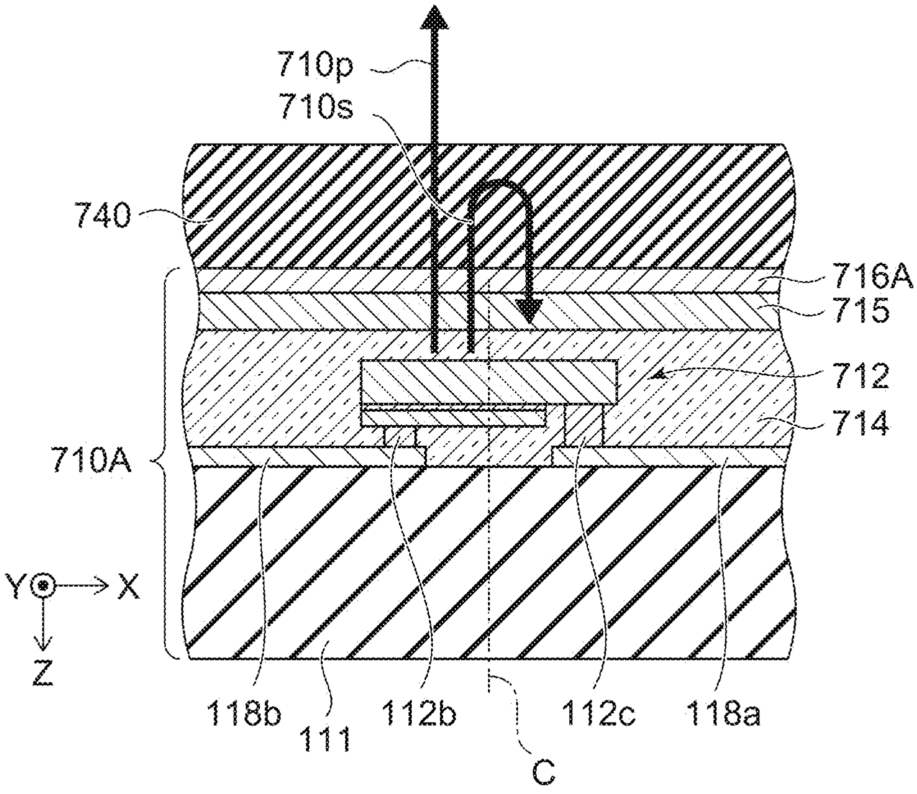
FIG. 24 is an enlarged cross-sectional view of a portion of the display device and the reflective polarizing element shown in FIG. 23.

FIG. 24 is an enlarged cross-sectional view of a portion of the display device and the reflective polarizing element shown in FIG. 23.

As shown in FIGS. 23 and 24, the image display device 70A according to the embodiment differs from the image display device 10 according to the first embodiment in that a display device 710A is included instead of the display device 110, and a reflective polarizing element 740 is further included. The display device 710A according to the embodiment differs from the display device 110 according to the first embodiment in that the light-emitting surface of the LED element 712 is substantially flat, and a protective layer 714, a wavelength conversion member 715, and a light-scattering member 716A are further included. Otherwise, the configuration of the display device 710A is similar to that of the display device 110 according to the first embodiment. Similarly to the light source unit 11 according to the first embodiment, a light source unit 71A according to the embodiment includes the color change sheet 130 and the drive unit 140. However, the color change sheet 130 and the drive unit 140 are not illustrated in FIG. 23.

The protective layer 714 covers multiple LED elements 712 arranged in a matrix configuration. The protective layer 714 can include, for example, a light-transmitting material such as a polymer material that includes a sulfur(S)-including substituent group or a phosphorus (P) atom-including group, a high refractive index nanocomposite material in which inorganic nanoparticles having a high refractive index are added to a polymer matrix of polyimide, etc.

The wavelength conversion member 715 is located on the protective layer 714. The wavelength conversion member 715 includes one or more types of wavelength conversion materials such as a general fluorescer material, a perovskite fluorescer material, a quantum dot (QD), etc. The light that is emitted from each LED element 712 is incident on the wavelength conversion member 715. The wavelength conversion material that is included in the wavelength conversion member 715 emits light of a different light emission peak wavelength from the light emission peak wavelength of the LED element 712 by the light emitted from the LED element 712 being incident on the wavelength conversion material. The light that is emitted by the wavelength conversion member 715 has a substantially Lambertian light distribution.

The light-scattering member 716A includes, for example, a light-transmitting resin member, and light-scattering particles or voids located inside the resin member. Examples of the resin member include, for example, polycarbonate, etc. Examples of the light-scattering particles include, for example, materials having a refractive index difference with the resin member such as titanium oxide, etc. A light scattering effect may be obtained by providing an unevenness in the surface of the light-scattering member 716A by surface roughening.

For example, a multilayer stacked thin film polarizing plate in which thin film layers having different polarization characteristics are stacked, etc., can be used as the reflective polarizing element 740. The reflective polarizing element 740 is located on the display device 710A. According to the embodiment, the reflective polarizing element 740 is located on the light-scattering member 716A. Therefore, the light that is emitted from the LED element 712 and the wavelength conversion member 715 is incident on the reflective polarizing element 740. The reflective polarizing element 740 transmits a first polarized light 710*p* of the light emitted from the display device 710A and reflects, toward the display device 710A, a second polarized light 710*s*. The oscillation direction of the electric field of the second polarized light 710*s* is substantially orthogonal to the oscillation direction of the electric field of the first polarized light 710*p*.

According to the embodiment, the first polarized light 710*p* is P-polarized light, and the second polarized light 710*s* is S-polarized light. Herein, "P-polarized light" means light of which the oscillation direction of the electric field is substantially parallel to the XY-plane. "S-polarized light" means light of which the oscillation direction of the electric field is substantially perpendicular to the XY-plane including the incident light and the reflected light.

There are cases where the viewer 14 driving the vehicle 13 wears polarized sunglasses 14*b* to reduce glare such as sunlight reflected by a puddle or the like in front of the vehicle 13 and transmitted by the front windshield 13*a*, etc. In such a case, the component corresponding to the P-polarized light of the sunlight reflected by the puddle or the like when viewed from the front windshield 13*a* is particularly reduced; therefore, the polarized sunglasses 14*b* are designed to shield the greater part of the S-polarized light. Accordingly, when the viewer 14 wears the polarized sunglasses 14*b*, there is a possibility that the second image IM2 may be difficult for the viewer 14 to view because the polarized sunglasses 14*b* undesirably shield the greater part of the S-polarized light included in the light emitted by the display device 710A. In the specification, P-polarized light and S-polarized light are physically defined by reflection objects such as the puddles and the like described above.

According to the embodiment, the reflective polarizing element 740 transmits the first polarized light 710*p* and reflects the second polarized light 710*s* of the light emitted from the display device 710A. After traveling via the imaging optical system 120, the reflection unit 12, and the inner surface of the front windshield 13*a*, the greater part of the first polarized light 710*p* transmitted by the reflective polarizing element 740 enters the eyebox 14*a* without being shielded by the polarized sunglasses 14*b*. The incidence angle of the first polarized light 710*p* when incident on the inner surface of the front windshield 13*a* is set to a different angle from Brewster's angle.

Specifically, as shown in FIG. 24, the light that is emitted from the LED element 712 is irradiated on the wavelength conversion member 715. As a result, the wavelength conversion member 715 is excited and emits light of a longer light emission peak wavelength than the light emission peak wavelength of the light emitted from the LED element 712. According to the embodiment, the light that is emitted from the display device 710A includes light emitted from the LED element 712 and light emitted from the wavelength conversion member 715. Hereinbelow, the light that is emitted from the display device 710A and emitted from the LED element 712 also is called "short-wavelength light", and the light that is emitted from the wavelength conversion member 715 also is called "long-wavelength light." However, a greater part of the light emitted from the LED element 712 may be absorbed by the wavelength conversion member 715.

The greater part of the first polarized light 710*p* included in the short-wavelength and long-wavelength light is transmitted by the reflective polarizing element 740 and emitted from the imaging optical system 120. The greater part of the second polarized light 710*s* included in the short-wavelength and long-wavelength light is reflected by the reflective polarizing element 740. Scattering reflection of a portion of the second polarized light 710*s* reflected by the reflective polarizing element 740 is performed by components of the display device 710A such as the light-scattering member 716A, the wavelength conversion member 715, etc. A portion of the second polarized light 710*s* is converted into the first polarized light 710*p* by the scattering reflection. A portion of the first polarized light 710*p* converted from the second polarized light 710*s* is transmitted by the reflective polarizing element 740 and emitted from the light source unit 71A. Therefore, the luminance of the first image IM1 can be increased while increasing the ratio of the first polarized light 710*p* included in the light emitted from the light source unit 71A. By improving the luminance of the first image IM1, the luminance of the second image IM2 also is improved. As a result, the viewer 14 easily views the second image IM2.

A portion of the short-wavelength light included in the second polarized light 710*s* may be reflected by the reflective polarizing element 740 and then incident on the wavelength conversion member 715. In such a case, an effect can be expected in which the wavelength conversion member 715 absorbs the short-wavelength light of the second polarized light 710*s* and radiates new long-wavelength light. Both the scattered reflection light and the radiated light have substantially Lambertian light distributions. The reflective polarizing element 740 itself may perform scattering reflection of the second polarized light 710*s*. In such a case as well, a portion of the second polarized light 710*s* is converted into the first polarized light 710*p* by the scattering reflection.

According to the embodiment, one reflective polarizing element 740 covers all of the pixels of the display device 710A. However, the light source unit may include multiple reflective polarizing elements, and the reflective polarizing elements may be located respectively on the pixels. The configuration of the display device used in combination with the reflective polarizing element is not limited to the configuration described above. For example, the display device may be configured without a light-scattering member by using the light scattering reflection effect of the wavelength conversion member. The display device may be configured without a wavelength conversion member by using the scattering reflection effect of the light-scattering member. The display device may be configured without a wavelength conversion member or a light-scattering member by using the light scattering reflection effect of multiple recesses or multiple protrusions provided in the light-emitting surface of the LED element as in the first embodiment.

Effects of the embodiment will now be described.

The light source unit 71A according to the embodiment further includes the reflective polarizing element 740 that is located on the display device 710A, transmits the first polarized light 710*p* of the light emitted from the display device 710A, and reflects the second polarized light 710*s* of the light emitted from the display device 710A. Therefore, the luminance of the first image IM1 can be increased while increasing the ratio of the first polarized light 710*p* included in the light emitted from the light source unit 71A.

The light that is emitted from the reflective polarizing element 740 also has a substantially Lambertian light distribution. Therefore, according to the embodiment as well, the light source unit 71A that is compact and can form the high-quality first image IM1 can be provided. Because the multiple LED elements 712 are discretely mounted on the substrate 111, the first image IM1 may have a grainy appearance. The wavelength conversion member 715 has the effect of relaxing the grainy appearance. The light-scattering member 716A can further reinforce the effect of relaxing the grainy appearance. Otherwise, the configuration, operations, and effects according to the embodiment are similar to those of the first embodiment.

Ninth Embodiment

A ninth embodiment will now be described.

Figure 25:
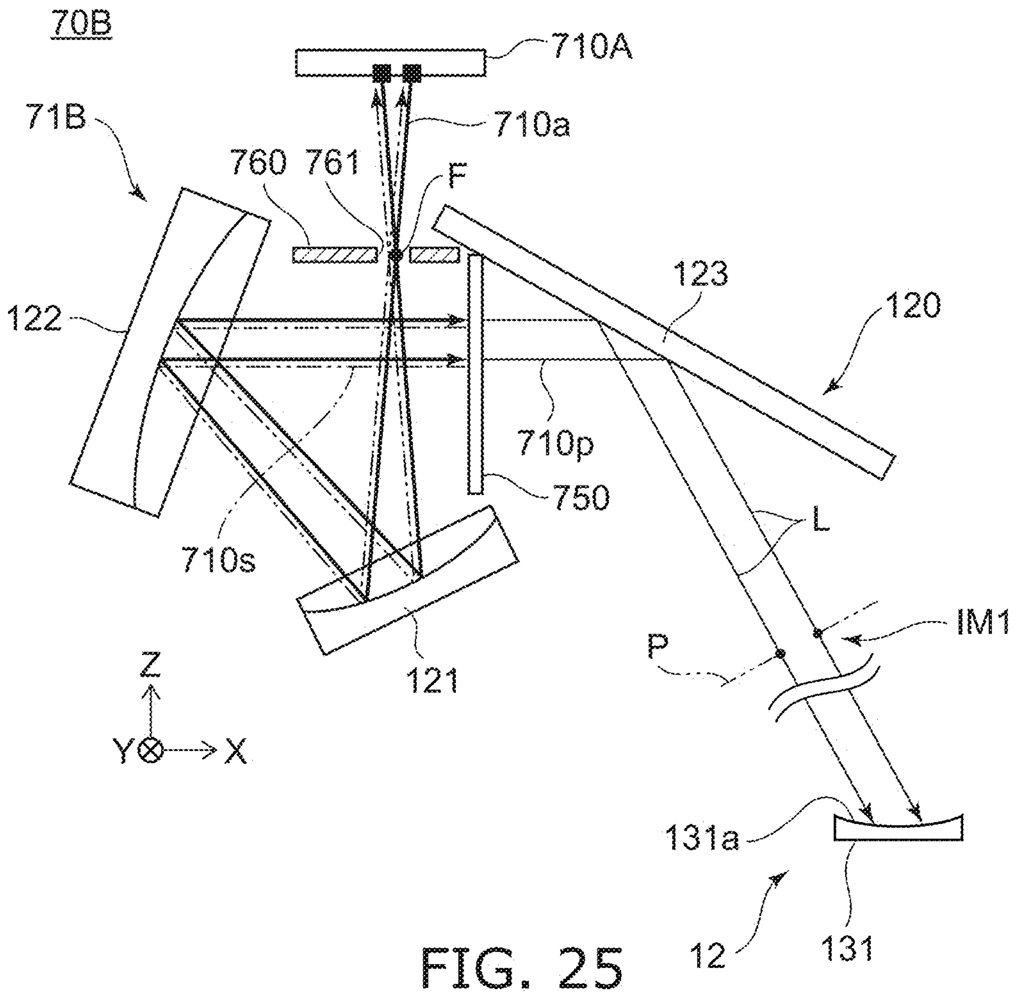
FIG. 25 is a side view showing a light source unit according to a ninth embodiment.

FIG. 25 is a side view showing a light source unit according to the embodiment.

As shown in FIG. 25, an image display device 70B according to the embodiment differs from the image display device 10 according to the first embodiment in that a light source unit 71B includes the display device 710A having a configuration similar to that of the eighth embodiment instead of the display device 110, and a reflective polarizing element 750 and a light-shielding member 760 are further included. In FIG. 25, only the light-shielding member 760 is shown in cross section.

The reflective polarizing element 750 can include, for example, a wire-grid reflective polarizing element using multiple metal nanowires. The reflective polarizing element 750 is located in a part of the optical path from the display device 710A to the reflection unit 12 at which the multiple chief rays L are substantially parallel to each other. According to the embodiment, the multiple chief rays L are substantially parallel to each other in the optical path between the intermediate element 122 and the reflection unit 12, and the reflective polarizing element 750 is located between the intermediate element 122 and the output element 123.

The reflective polarizing element 750 transmits the first polarized light 710*p*, which is P-polarized light, and reflects the second polarized light 710*s*, which is S-polarized light, to return the second polarized light 710*s* to the display device 710A. Specifically, the display device 710A emits light 710*a* that includes the first and second polarized lights 710*p* and 710*s*. The light 710*a* travels via the input element 121 and the intermediate element 122 and then is incident on the reflective polarizing element 750.

The reflective polarizing element 750 transmits the greater part of the first polarized light 710*p* included in the light 710*a*. The greater part of the first polarized light 710*p* transmitted by the reflective polarizing element 750 travels via the output element 123 and then is emitted from the reflection unit 12.

The reflective polarizing element 750 reflects the greater part of the second polarized light 710*s* included in the light 710*a* and returns the greater part of the second polarized light 710*s* along the optical path from the display device 710A to the reflective polarizing element 750. Specifically, the reflective polarizing element 750 has a flat plate shape. The reflective polarizing element 750 is arranged to be substantially orthogonal to the chief rays L. The reflective polarizing element 750 specularly reflects the greater part of the second polarized light 710*s*. Therefore, the greater part of the second polarized light 710*s* reflected by the reflective polarizing element 750 travels via the intermediate element 122 and the input element 121 in this order and then returns to the display device 710A.

Scattering reflection of a portion of the second polarized light 710*s* returning to the display device 710A is performed by components of the display device 710A such as the light-scattering member 716A, the wavelength conversion member 715, etc. A portion of the second polarized light 710*s* is converted into the first polarized light 710*p* by the scattering reflection. A portion of the first polarized light 710*p* converted from the second polarized light 710*s* travels via the input element 121 and the intermediate element 122 and then is transmitted by the reflective polarizing element 750. The greater part of the first polarized light 710*p* transmitted by the reflective polarizing element 750 travels via the output element 123 and then is emitted from the reflection unit 12. Therefore, the luminance of the second image IM2 can be increased while increasing the ratio of the first polarized light 710*p* included in the light emitted from the image display device 70B. As a result, the viewer 14 easily views the second image IM2.

Similarly to the eighth embodiment, a portion of the short-wavelength light included in the second polarized light 710*s* returning to the display device 710A may be irradiated on the wavelength conversion member 715. In such a case as well, similarly to the eighth embodiment, the wavelength conversion member 715 absorbs the short-wavelength light of the second polarized light 710*s*, and an effect of radiating new long-wavelength light can be expected.

The light-shielding member 760 is located between the display device 710A and the input element 121 of the imaging optical system 120. For example, the light-shielding member 760 has a flat plate shape substantially parallel to the XY-plane. An aperture 761 that extends through the light-shielding member 760 in the Z-direction is provided in the light-shielding member 760. The focal point F of the imaging optical system 120 is positioned inside the aperture 761.

The light emitted from the display device 710A and passing through the focal point F and the vicinity of the focal point F passes through the aperture 761 of the light-shielding member 760 and is incident on the input element 121, and the greater part of the light other than the light passing through the aperture 761 is shielded by the light-shielding member 760. The second polarized light 710*s* that is reflected by the reflective polarizing element 750 and travels along the optical path, i.e., the light that passes through the focal point F and the vicinity of the focal point F, passes through the aperture 761 of the light-shielding member 760 and returns to the display device 710A. On the other hand, the greater part of the second polarized light 710*s* that is reflected by the reflective polarizing element 750 and travels toward the display device 710A and not along the optical path is shielded by the light-shielding member 760.

Effects of the embodiment will now be described.

The image display device 70B according to the embodiment further includes the reflective polarizing element 750. The reflective polarizing element 750 is located at a part of the optical path from the display device 710A to the reflection unit 12 at which the multiple chief rays L that are emitted from mutually-different positions of the display device 710A and pass through the first image IM1 are substantially parallel to each other, transmits the first polarized light 710*p* of the light emitted from the display device 710A, and reflects the second polarized light 710*s* of the light emitted from the display device 710A to return the second polarized light 710*s* to the display device 710A. Therefore, the luminance of the second image IM2 can be increased while increasing the ratio of the first polarized light 710*p* included in the light emitted from the image display device 70B.

The light-shielding member 760 is located between the display device 710A and the input element 121. The aperture 761 that transmits the second polarized light 710*s* returning to the display device 710A along the optical path is provided in the light-shielding member 760. Therefore, the second polarized light 710*s* that is reflected by the reflective polarizing element 750, does not travel along the optical path, and becomes stray light can be prevented from traveling toward the display device 710A while permitting the second polarized light 710*s* that is reflected by the reflective polarizing element 750 and travels along the optical path to return to the display device 710A. The quality of the first and second images IM1 and IM2 can be increased thereby. The light that is emitted from the display device 710A, does not travel along the optical path, and becomes stray light can be prevented by the light-shielding member 760 from being reflected by the reflective polarizing element 750 and/or optical elements of the imaging optical system 120, traveling toward the display device 710A, and being re-excited and/or scattered and reflected at unexpected locations.

The light-shielding member 760 may not be included in the image display device 70B. The reflective polarizing element 740 described in the third embodiment may be further provided on the display device 710A of the image display device 70B. In such a case, the second polarized light 710*s* that could not be reflected by the reflective polarizing element 740 on the display device 710A can be reflected by the reflective polarizing element 750. Therefore, the luminance of the second image IM2 can be increased while increasing the ratio of the first polarized light 710*p* included in the light emitted from the image display device 70B. Otherwise, the configuration, operations, and effects according to the embodiment are similar to those of the third embodiment.

Modification of Ninth Embodiment

A modification of the ninth embodiment will now be described.

Figure 26:
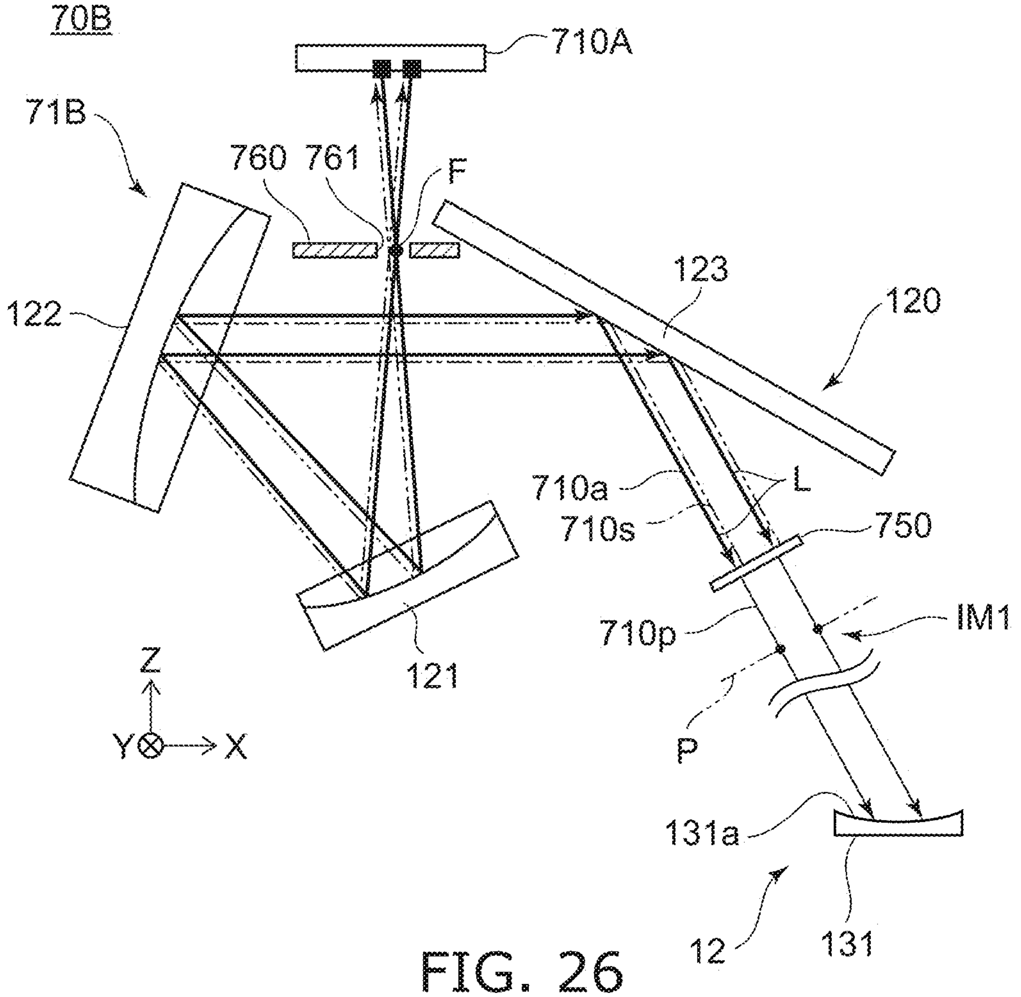
FIG. 26 is a side view showing a light source unit according to a modification of the ninth embodiment.

FIG. 26 is a side view showing a light source unit according to the modification.

In FIG. 26 as well, only the light-shielding member 760 is shown in cross section.

According to the modification as shown in FIG. 26, the reflective polarizing element 750 is located between the output element 123 and the reflection unit 12. Although an example is shown in FIG. 26 in which the reflective polarizing element 750 is positioned between the output element 123 and the first image IM1, a reflective polarizing element 570 may be located between the first image IM1 and the reflection unit 12. Otherwise, the configuration, operations, and effects according to the modification are similar to those of the ninth embodiment.

Embodiments and their modifications described above are examples embodying the invention, and the invention is not limited to these embodiments and their modifications. For example, additions, deletions, or modifications of some of the components or processes of the embodiments and modifications described above also are included in the invention. The embodiments and modifications described above can be implemented in combination with each other.

For example, the invention can be utilized in a head-up display.

EXPLANATION OF REFERENCE NUMBERS

10: image display device
11: light source unit
12: reflection unit
13: vehicle
13*a*: front windshield
13*b*: ceiling part
13*c*: dashboard part
13*h*1, 13*h*2: through-hole
13*s*1, 13*s*2: wall
14: viewer
14*a*: eyebox
14*b*: polarized sunglasses
20: image display device
22: reflection unit
70A, 70B: image display device
71A, 71B: light source unit
110: display device
110*c*: center
110*p*: pixel
111: substrate
112: LED element
112*a*: semiconductor stacked body
112*b*: anode electrode
112*c*: cathode electrode
112*p*1: p-type semiconductor layer
112*p*2: active layer
112*p*3: n-type semiconductor layer
112*s*: light-emitting surface
112*t*: recess
115: wavelength conversion member
118*a*, 118*b*: wiring part
120, 2120: imaging optical system
120*a*: bending part
120*b*: direction modifying part
121: input element
121*a*: mirror surface
122: intermediate element
122*a*: mirror surface
123: output element
123*a*: mirror surface
130, 130*e*, 130*f*: color change sheet
130*a*: first region
130*b*: second region
130*c*: third region

130*p*: region
131: mirror
131*a*: mirror surface
140: drive unit
230, 230*a*, 230*f*, 230*h*, 230*g*: color change sheet
230*a*: first region
230*b*: second region
230*c*: third region
230*p*: region
322: mirror
322*a*: mirror surface
330: color change sheet
330*a*: first region
330*b*: second region
330*c*: third region
330*u*: minimum unit
430: color change sheet
430*a*: first region
430*b*: second region
430*c*: third region
530: color change sheet
570: reflective polarizing element
710A: display device
710*a*: light
710*p*: first polarized light
710*s*: second polarized light
712: LED element
714: protective layer
715: wavelength conversion member
716A: light-scattering member
740: reflective polarizing element
750: reflective polarizing element
760: light-shielding member
761: aperture
1000: automobile
2110: display device
2110*p*: pixel
2110*s*: light-emitting surface
2120: imaging optical system
C: optical axis
F: focus
IM1: first image
IM2: second image
L: light ray
P: position
P1: first plane
P2: second plane
a1, a2: point
θ: angle

What is claimed is:

1. A light source unit comprising:

a display device configured to emit light that has a substantially Lambertian light distribution and to display an image including a plurality of pixels;

a color change sheet on which light emitted from the display device is incident;

an imaging optical system comprising an input element and an output element configured such that light emitted from the color change sheet is incident on the input element, light traveling via the input element is incident on the output element, and light emitted from the output element forms a first image corresponding to the image; and a drive unit configured to change a positional relationship of the display device and the color change sheet; wherein:

the color change sheet comprises:

a first region on which light from the pixels is incident, the first region configured to emit light of a first color, and a second region on which the light from the pixels is incident, the second region configured to emit light of a second color different from the first color;

the drive unit is configured to change the positional relationship of the display device and the color change sheet between:

a first positional relationship in which light emitted from one of the pixels is incident on the first region, and a second positional relationship in which the light emitted from the one of the pixels is incident on the second region; and the imaging optical system is substantially telecentric at the first image side.

2. The light source unit according to claim 1, wherein:

the display device is configured such that a color of the light emitted from the pixels is the first color; and the first region is configured to transmit the light from the pixels.

3. The light source unit according to claim 1, wherein:

the second region is configured to transmit light of the second color among the light emitted from the pixels.

4. The light source unit according to claim 1, wherein:

the second region comprises a fluorescer adapted to absorb the light emitted from the pixels and to radiate light of the second color.

5. The light source unit according to claim 1, wherein:

the color change sheet further comprises a third region on which the light from the pixels is incident, the third region configured to emit light of a third color different from the first and second colors; and the drive unit changes the positional relationship of the display device and the color change sheet between:

the first positional relationship, the second positional relationship, and a third positional relationship in which the light emitted from the one of the pixels is incident on the third region.

6. The light source unit according to claim 5, wherein:

the plurality of pixels are arranged along a first direction and a second direction in the display device, the second direction crossing the first direction; and the first region, the second region, and the third region are arranged along the first direction in the color change sheet.

7. The light source unit according to claim 5, wherein:

the plurality of pixels are arranged along a first direction and a second direction in the display device, the second direction crossing the first direction; and in the color change sheet, the first region and the second region are arranged along the first direction, and the first region and the third region are arranged along the second direction.

8. The light source unit according to claim 1, wherein:

the light emitted from the display device has a light distribution pattern in which a luminous intensity in a direction of an angle θ with respect to an optical axis of the light emitted from the display device is approximated by $\cos^n\theta$ times a luminous intensity at the optical axis, wherein n is a value greater than 0.

9. The light source unit according to claim 8, wherein:

n is not more than 11.

10. The light source unit according to claim 1, wherein:

the display device is an LED display comprising a plurality of LED elements.

11. The light source unit according to claim 10, wherein:

the LED elements are configured to emit light that has a substantially Lambertian light distribution.

12. The light source unit according to claim 10, wherein:

the display device further comprises a wavelength conversion member located on the LED elements; and light emitted from the LED elements is incident on the wavelength conversion member.

13. The light source unit according to claim 1, wherein:

the imaging optical system comprises:

a bending part comprising the input element, and a direction modifying part comprising the output element, the bending part being configured to bend a plurality of chief rays that are emitted from mutually-different positions of the display device, cross each other before being incident on the input element, and reach the first image;

the bending part is configured to bend the plurality of chief rays to be substantially parallel before and after the first image; and the direction modifying part is configured to modify a travel direction of the plurality of chief rays so that the plurality of chief rays traveling via the bending part are oriented toward a formation position of the first image.

14. The light source unit according to claim 1, further comprising:

a light-shielding member located between the display device and the imaging optical system, the light-shielding member comprising an aperture;

a portion of light from the display device toward the imaging optical system passes through the aperture;

another portion of the light from the display device toward the imaging optical system is shielded by the light-shielding member.

15. An image display device comprising:

the light source unit according to claim 1; and a reflection unit separated from the light source unit, the reflection unit configured to reflect light emitted from the imaging optical system such that the first image is formed between the light source unit and the reflection unit.

16. The image display device according to claim 15, further comprising:

a reflective polarizing element located in an optical path from the display device to the reflection unit; wherein:

the reflective polarizing element is configured to transmit a first polarized light of the light emitted from the display device, and reflect a second polarized light of the light emitted from the display device so that the second polarized light returns to the display device.

17. An automobile comprising:

a vehicle; and the image display device according to claim 15, the image display device being fixed to the vehicle.

* * * * *